(12) United States Patent
Fleetwood et al.

(10) Patent No.: US 9,038,043 B1
(45) Date of Patent: May 19, 2015

(54) SYSTEMS AND METHODS OF INFORMATION PROCESSING INVOLVING ACTIVITY PROCESSING AND/OR OPTIMIZATION FEATURES

(71) Applicant: Row Sham Bow, Orlando, FL (US)

(72) Inventors: Paul Michael Fleetwood, Orlando, FL (US); Valmon Joseph Leblanc, Orlando, FL (US); Christopher Reid Staymates, Winter Park, FL (US); Nicholas Gonzalez, Winter Garden, FL (US)

(73) Assignee: Row Sham Bow, Inc., Orlando, FL (US)

( * ) Notice: Subject to any disclaimer, the term of this patent is extended or adjusted under 35 U.S.C. 154(b) by 0 days.

(21) Appl. No.: 13/924,463

(22) Filed: Jun. 21, 2013

Related U.S. Application Data

(60) Provisional application No. 61/662,633, filed on Jun. 21, 2012.

(51) Int. Cl.
    *G06F 9/45*     (2006.01)
    *G06Q 30/02*     (2012.01)

(52) U.S. Cl.
    CPC .................................. *G06Q 30/0246* (2013.01)

(58) Field of Classification Search
    None
    See application file for complete search history.

(56) References Cited

U.S. PATENT DOCUMENTS

| | | | |
|---|---|---|---|
| 2005/0060048 A1* | 3/2005 | Pierre et al. | 700/28 |
| 2005/0125710 A1* | 6/2005 | Sanghvi | 714/39 |
| 2005/0144267 A1* | 6/2005 | Maron | 709/223 |
| 2007/0022410 A1* | 1/2007 | Ban et al. | 717/136 |
| 2008/0189156 A1* | 8/2008 | Voda et al. | 705/7 |
| 2010/0235204 A1* | 9/2010 | Farkkila | 705/7 |
| 2011/0145795 A1* | 6/2011 | Khanapurkar et al. | 717/126 |
| 2011/0320391 A1* | 12/2011 | Chen et al. | 706/14 |
| 2012/0192172 A1* | 7/2012 | Hansmann et al. | 717/168 |
| 2013/0139130 A1* | 5/2013 | Anjan et al. | 717/131 |
| 2013/0282333 A1* | 10/2013 | Mast et al. | 702/182 |

* cited by examiner

*Primary Examiner* — Don Wong
*Assistant Examiner* — Daxin Wu
(74) *Attorney, Agent, or Firm* — DLA Piper LLP (US)

(57) ABSTRACT

Systems and methods are disclosed for optimizing applications per user. In one exemplary implementation, there is provided a method for optimizing an application by monitoring performance indicators of the application. Users are classified based on the performance indicators into sets. Behavior patterns are identified among user sets. Moreover, illustrative methods may include modifying configurable tuning variables of the application based on the behavior patterns.

34 Claims, 19 Drawing Sheets

SYSTEMS AND METHODS OF INFORMATION PROCESSING INVOLVING ACTIVITY PROCESSING AND/OR OPTIMIZATION FEATURES

CROSS-REFERENCE TO RELATED APPLICATION INFORMATION

This application claims benefit/priority of provisional patent application No. 61/662,633, filed Jun. 21, 2012, which is incorporated herein by reference in entirety.

BACKGROUND

As the number of online connected users, devices and applications grow it is becoming increasingly difficult for new applications to attract, retain, and ultimately monetize new users. The current processes for optimizing applications may produce sub-optimal results, may be time consuming, and may be inefficient in terms of both time and resources. The current practice is to record and monitor key performance indicators (KPIs) in an effort to identify KPIs to attempt to improve. Common KPIs include (but are not limited to) daily active users, total paying users, conversion rates, average revenue per daily active user, etc. When a KPI to improve is agreed upon, then a hypothesis on why the KPI is underperforming and recommendations for possible solutions may be formed. In many cases, teams of data analysts analyze log files generated by the application to aid in discovery of possible solutions. Eventually, a solution is proposed and presented to the software development team. If the team accepts this proposal, they will modify the application. In many cases these changes will be included in the next release of the software. In some cases, the development team may choose to roll out the changes to a small group of users so they can compare the KPI impact of the changes to a control group that does not have the changes. This process is repeated indefinitely until the KPIs reach their business targets or the continued support and development of the application no longer meets the goals of the project. Refer to FIG. 1 for an example of this process applied to a video game application running in a social network.

BRIEF DESCRIPTIONS OF THE DRAWINGS

The accompanying drawings, which constitute a part of this specification, illustrate various implementations and features of the present inventions and together with the description, help explain aspects of the innovations herein. In the drawings.

DETAILED DESCRIPTION OF ILLUSTRATIVE IMPLEMENTATIONS

Figure 1:
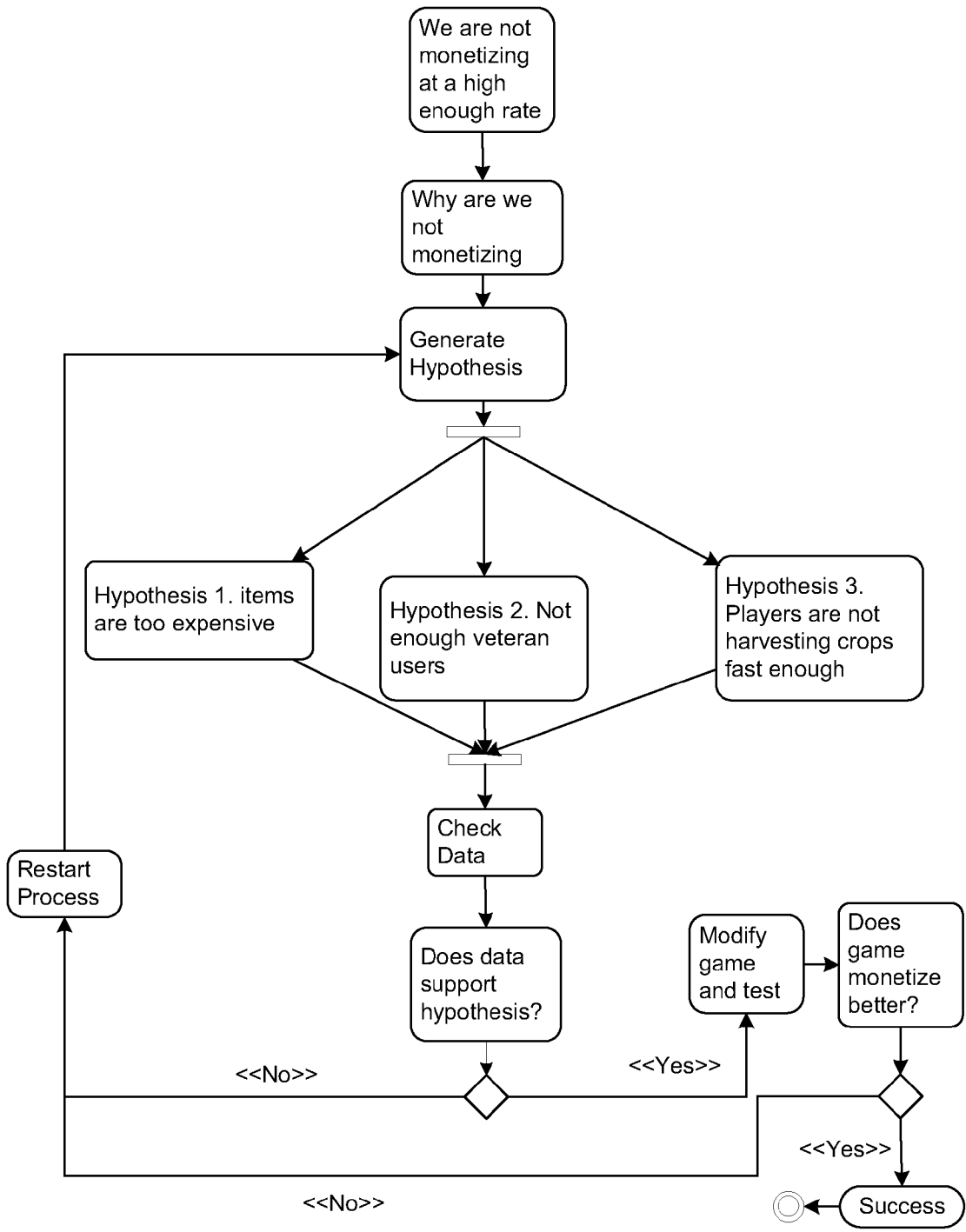
FIG. 1 is a flowchart of conventional application optimization.

Reference will now be made in detail to the inventions herein, examples of which are illustrated in the accompanying drawings. The implementations set forth in the following description do not represent all implementations consistent with the present inventions. Instead, they are merely some examples consistent with certain aspects related to the present innovations. Wherever possible, the same reference numbers will be used throughout the drawings to refer to the same or like parts.

Systems and methods described herein may provide high performing applications that appeal to a broad audience. Embodiments described herein may promote increases to revenue and retention via direct user monetization in an application by optimizing a game player experience automatically through in-game, real-time personalization, for example. In addition to in-game performance improvements, the click through rate and quality of players obtained via online advertising campaigns may be increased by automatically identifying high value user profiles for the purpose of targeted advertising campaigns. Systems and methods described herein may affect game operation as well. By automating analytics and optimization, team sizes may be made small. The automatic optimization processes also may reduce a frequency of new version releases through the use of configurable tuning variables that control application behavior, a state based event stream model, dynamic data definition files that extend event and state descriptions improving predictive accuracy, and a dynamic data transform system that modifies data aggregation policy to create user state vectors that match new and updated prediction models.

According to one example embodiment, systems and methods herein may include or involve behavioral analytics processes and/or engines that may enable social game entities to optimize revenue, customer acquisition, and retention. Implementations may use pattern recognition algorithms for identifying sets of users that out-perform the general audience against key performance indicators. Further, embodiments may identify behavioral similarities among high— performing groups of users, allowing game operators to modify the product to push players into higher performance bands, increasing the overall performance of the game.

The systems and methods described herein may automate and/or optimize such processes by identifying patterns of gameplay that already optimize KPIs. This may reduce or remove the need for a team of data analysts, thereby reducing overall operations costs as well as reducing or removing the need to hypothesize on why KPIs are not optimized. Further, the systems and methods described herein may enable correct identification of hard-coded play patterns that lead to poor KPI performance.

Given a stream of events, systems and methods described herein may derive a descriptive data model from the event stream that represents the structure of the data, relationship between data elements in the stream, and temporal data contained within the stream. Various descriptive data models and processes for building descriptive data models may be used. The descriptive data model(s) may require no prior knowledge of the application, may be generated algorithmically, may provide high-level information, and may preserve the detail of the event stream (which may be called "The Multi-Dimensional Data Representation").

For a descriptive data model, any data element in the stream may be used to create a conditional statement that defines a set (as defined by set theory) such that (by the laws of set theory) an object (or user) may have a binary relationship with the given set (which can further be described as either inclusion or exclusion). Such a conditional statement may be used as a goal for optimizing either the inclusion or exclusion of objects in the newly defined set.

Further analysis can be performed which may identify combinations of variables and value ranges to formulate data clusters. Data clusters may have cluster pass rates. A cluster pass rate may be defined as the percentage of the entities in the data cluster that meet the goal criteria. Given data cluster pass rates, a set of interesting clusters may be identified as those that deviate from the entire population pass rate for a given goal by some amount, for example as defined by a threshold value.

Multiple event streams may be constructed from single event streams by partitioning the original event stream into n partitioned streams in a consistent manner. Given two partitioned streams, for example, a full analysis to determine the set of interesting clusters may be performed on the first partition (training set), and the second partition may be used to test if a correlation found in the training set exists outside of the training set by finding all interesting clusters (as defined by the training set) in the test set and calculating their pass rate. A set of predictive clusters may be identified out of the set of interesting clusters. For example, predictive clusters may be identified if F (test pass rate, training pass rate)> threshold, where F is a comparison function. Standard K-Fold cross validation may be used across k data partitions to determine predictive power of each predictive data cluster, for example.

Given a descriptive data model that can be defined as a hierarchy or contains multiple levels of detail, the predictive analytical process may perform much iteration over the data set, starting with the lowest level of detail and working its way to the highest level of the detail or in reverse. Regardless of direction, the predictive process may terminate when either the information gained from further iteration is reduced below some threshold, or the information lost from further iteration is increased above some threshold. These processes are described in greater detail below.

Systems and methods described herein may be expressed as the Intelligent Software Optimization Systems and Methods, such systems and methods being referred to as "ISOSM" in short for the sake of convenience. While the following disclosure may use the term 'system', such terminology encompasses components including hardware, software, firmware, etc. providing such features or functionality.

Systems and methods described herein may comprise one or more computers. A computer may be any programmable machine or machines capable of performing arithmetic and/ or logical operations. In some embodiments, computers may comprise processors, memories, data storage devices, circuits, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, though the term "router" may appear in the following specification, the disclosed embodiments are not limited to routers.

Computers may be linked to one another via a network or networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via Wi-Fi, WiMax, or other wireless connection). Connections between computers may use any protocols, including connection oriented protocols such as TCP or connectionless protocols such as UDP. Any connection through which at least two computers may exchange data can be the basis of a network.

Figure 2:
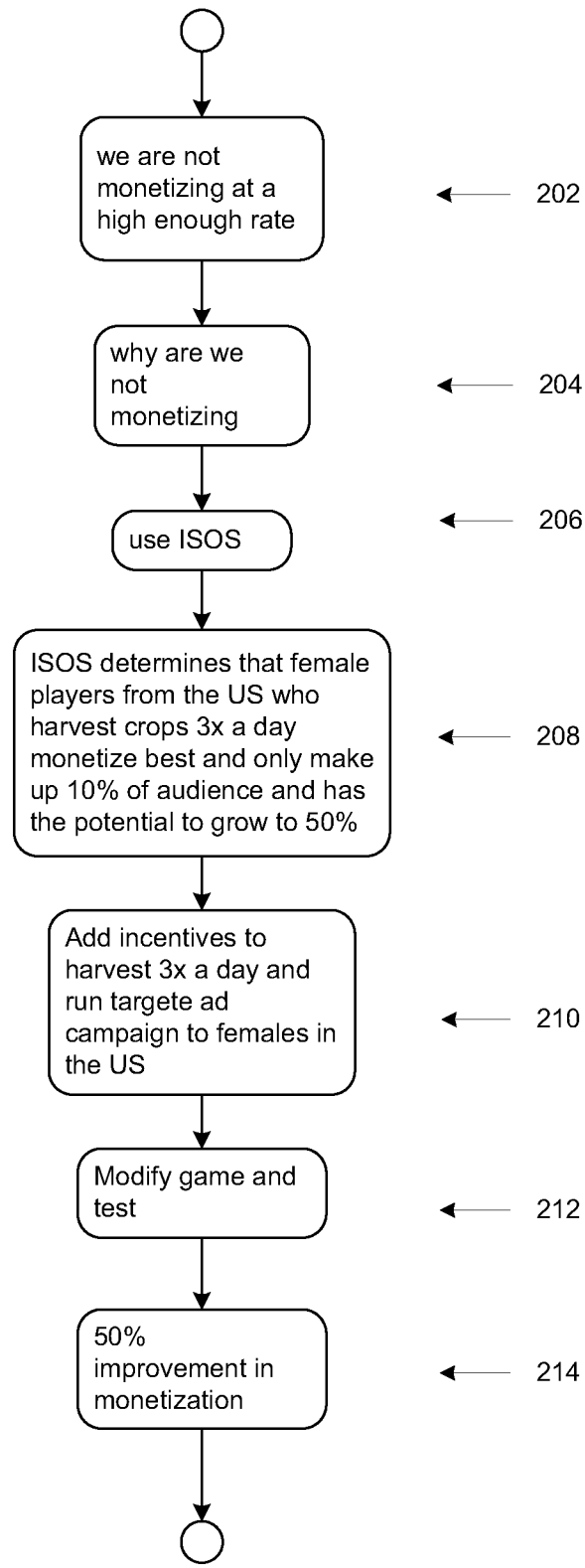
FIG. 2 is an exemplary flowchart of application optimization according to illustrative implementation(s) of the innovations herein.

FIG. 2 is an exemplary flowchart of application optimization according to illustrative implementation(s) of the innovations herein. FIG. 2 shows an example of using the ISOSM system to provide a prediction of how to improve monetization that is an advantage over the current typical methods which require manual testing. Referring FIG. 2, the system concludes at 202 that at the current point in time, the monetization rate is below the desired levels. An analysis begins at 204 by asking why the desired levels of monetization are not being realized, which leads to the activation of ISOS at 206. ISOS determines at 208 that female players in the US who harvest crops three times a day have the highest level of monetization, but only make up 10% of the audience. Furthermore, these players have the potential to grow to represent 50% of the audience. The system, at 210, decides to add incentives and initiates a targeted advertising campaign to get the desired demographic to increase their harvest levels to three times per day. These actions lead to a modification in the game at 212, this modification allows testing to be done to see if the desired effect is being actualized. The result of the modification is a 50% improvement in monetization at 214.

Figure 3:
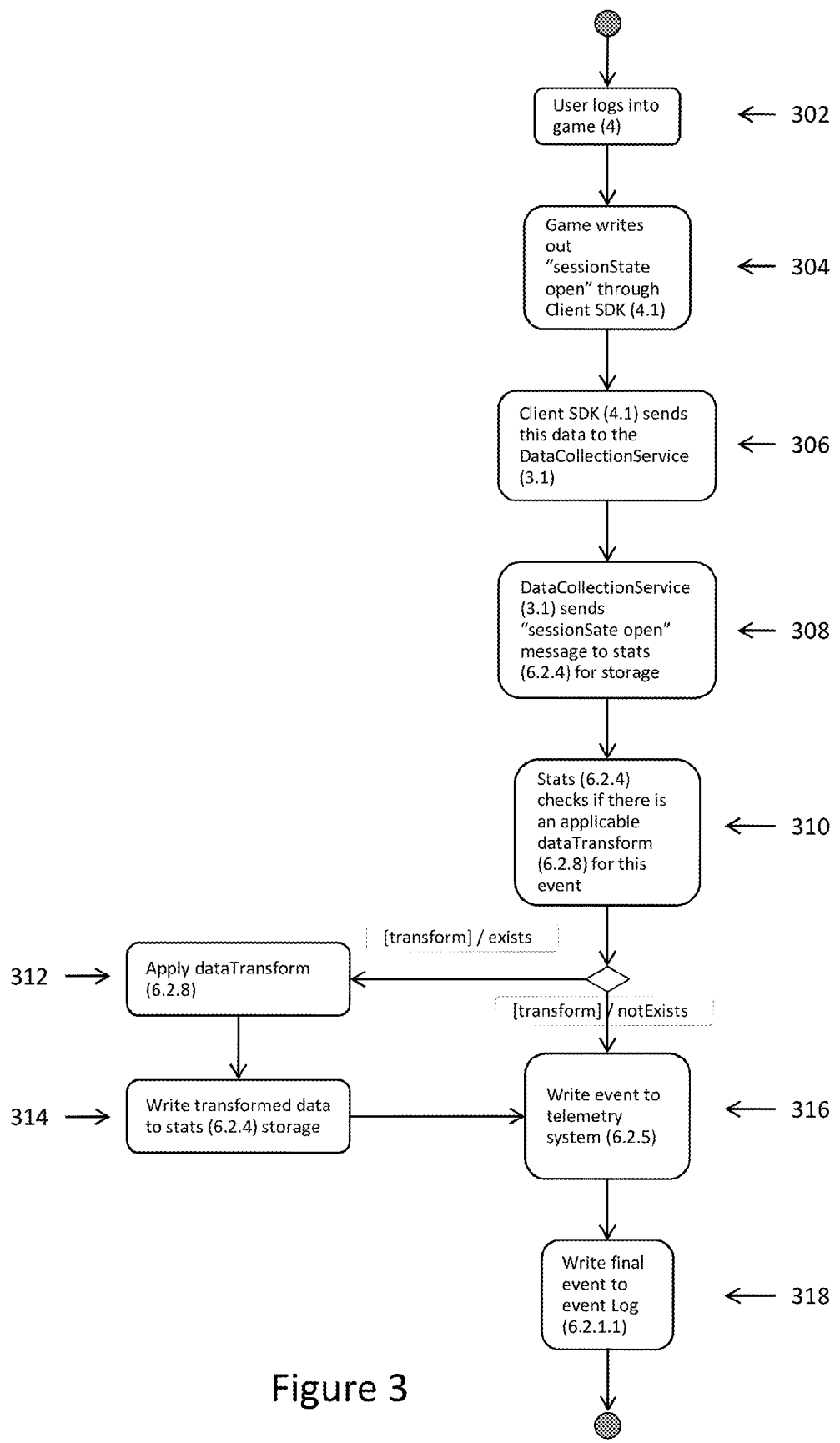
FIG. 3 is an exemplary flowchart of application data transformation according to illustrative implementation(s) of the innovations herein.

One or more of the computers or components associated with the innovations herein may include or involve a back office module. FIG. 3 is an exemplary flowchart of application data processing consistent with certain exemplary back office processing, according to illustrative implementation(s) of the present innovations. Referring to FIG. 3, after login 302, the game may write out session data through client SDK, at 304. According to the illustrated implementation, client SDK sends this data to the Data Collection Service 306, which may send a "sessionState open" message to stats (6.2.4) for storage, at 308. Stats (6.2.4) then checks to see if there is an applicable data transform (6.2.8) for this event, at 310. If so, the transform is applied 312, and the transformed data is written to stats (6.2.4) storage, at 314. Next, or when no applicable data transform exists, processing proceeds to step 316, where the event is written to the telemetry system. And, finally, the final event is written to the event Log (6.2.1.1), at 318.

Moreover, back office processing and/or modules herein may include one or more of the following features or functionality:

Event Data Format (2.1.3): Embodiments of ISOSM may utilize a standard format for the resulting log file or in-memory stream.

ISOS ETL (2.1.2): Embodiments of ISOSM may utilize a standard data transformation process that may convert event data into an analytical data format independent of the application that generated the events.

Analytical Data Format (2.1.1): Embodiments of ISOSM may define a generative, emergent, standard data format that may describe a user's interaction with a software application at multiple levels of detail that can be expanded on without modification to the software application that generated the event stream.

Descriptive Data Transformation (2.2.2.4): Embodiments of ISOSM may utilize a standard, highly scalable, distributed process and unsupervised learning system that may produce the descriptive data format.

Descriptive Data Format (2.2.2.3): Embodiments of ISOSM may define/use a generative, emergent, standard data format that may contain classifications of user behaviors at many levels of detail. The data format may store telemetry by providing a comprehensive view of an entity across transactions and over time in a fashion that may allow for quick data retrieval and manipulation, contextual information and easy association with other data. This may include, but is not limited to, links to properties that are associated with that entity, transactions that are linked to that entity, and properties that are associated with that transaction. For example a user entity may be one data format. The user entity could have transactions associated with it such as: starting and ending a session with an application, viewing a screen in an application, making a purchase in the application, signing into an application, or any other transaction that a user might perform. The user entity could have properties associated with it such as: gender, user credential type, nickname, or any other property that one might want to associate with a user. Transactions could have properties associated with it that are relative to the transaction. For instance, session id for a session transaction. The data file could contain the user entity along with associated transactions. It might have a login transaction. Within the login transaction there might be data at different time steps corresponding to progress that was made during the login process. The login process might contain a link to a session transaction that was in progress when the login was happening.

Predictive Data Transformation (2.2.2.4): Embodiments of ISOSM may define standard, highly scalable, distributed processes and/or supervised learning systems that may produce the predictive data format. Predictive data transformation may be a process by which the data from the Descriptive Data Format is transformed into a predictive model that may be used by the Predictive Control System. In this process, the predictive data transformation may operate on the contextual data in the descriptive data format. Due to the associations and structure of that data, the system may thus obtain high quality data and create high performance models.

Predictive Data Format (2.2.2.3): Embodiments of ISOSM may define a standard data format that contains a collection of classifications that have predictive power for a particular goal.

Runtime Data Bridge (2.2.1): Embodiments of ISOSM may involve processes for converting the predictive data into runtime predictive data, which may be used by the Prediction Control System to generate dynamic user segments with optimization goals without interrupting the application. The runtime data bridge may be responsible for creating predictive models and training/refining them using a Predictive Data Transformation. It may also be responsible for delivering the predictive models to the Prediction Control System.

User Acquisition System (7.1.6): Embodiments of ISOSM may involve configurable processes that may use the predictive data to determine the characteristics of high value users. Implementations may use those characteristics for controlling user targeting in each of the available marketing channels, including: open web, Facebook, and advertisements in other games running ISOSM.

One or more of the computers may include a runtime module. The runtime module may include one or more of the following features:

Runtime Predictive Data Format (6.5.1): Embodiments of ISOSM may include/involve/define a dynamic data format for storing relevant predictive data models for inclusion directly in the application that generated the event stream.

Prediction Control System (6.5.2): Embodiments of ISOSM may respond to updates to the predictive data format by creating data transforms for runtime data aggregation and defining user segments that are predictive for a desired goal. The goal may be defined as a conditional statement resulting in the definition of a set, and the goal may be associated with the user segment. This system may be responsible for delivering prediction services to any parts of the system that need it.

Figure 18:
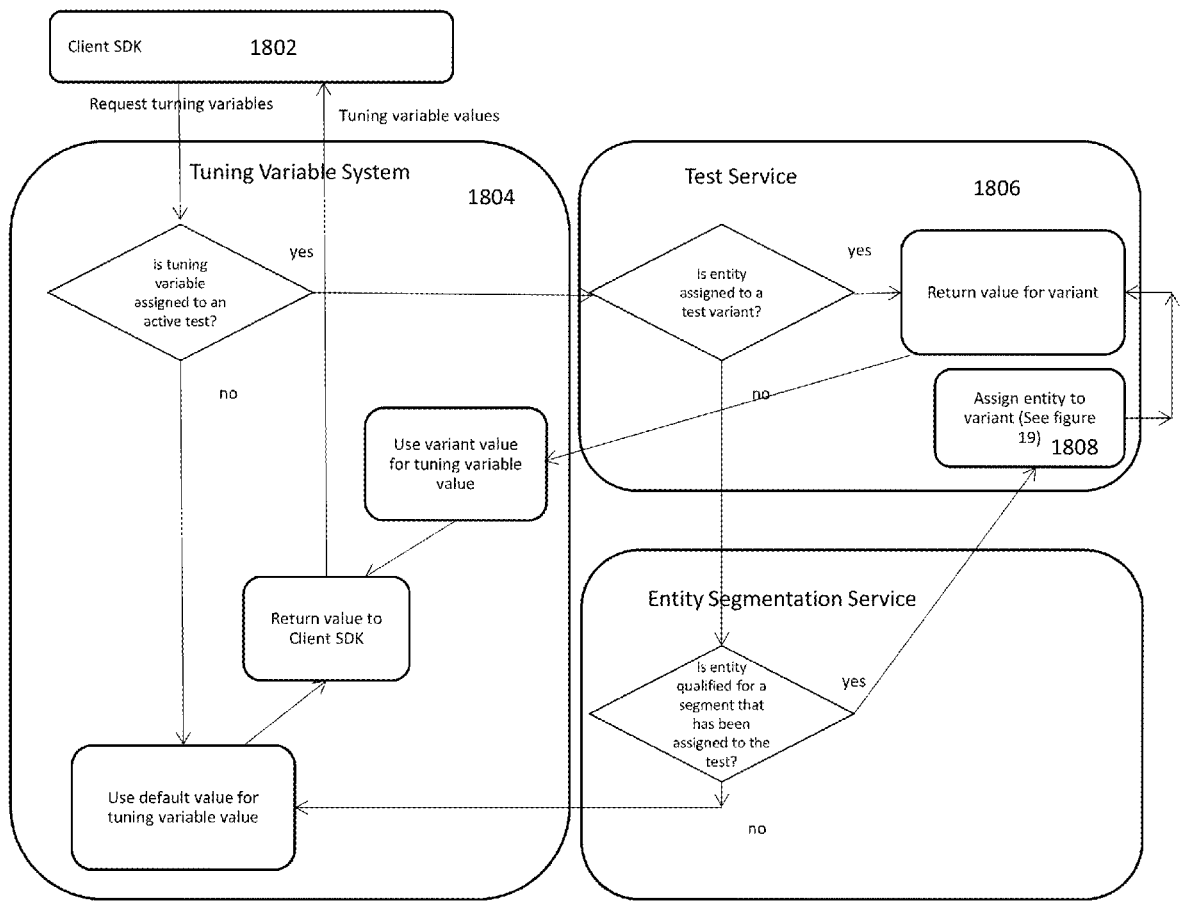
FIG. 18 is an exemplary flowchart of a tuning system according to illustrative implementation(s) of the innovations herein.

Tuning Variable System (6.6.1): FIG. 18 provides one example of the Tuning Variable System. Embodiments of ISOSM may include or involve a dynamic runtime variable tuning system that may alter program behavior without interrupting the application, modifying the code, or requiring a new version of the software to be released. The tuning variable system may include a server portion and a client portion. The client portion may request one or more tuning variables from the server. The server may provide the appropriate tuning variable values based on, for example, the current entity (user, device, etc.), any tests that are running (A/B, multivariate, etc.), or user segmentation, so that each client may receive a different value. The client may then use the value in the application. The value can be any type (integer, number, string, etc.). One example of how this could be used is for an A/B test around discounts displayed to a user for purchasing an item. The value of the discount may be a tuning variable that includes a number. The client may ask for the tuning variable for a user. The server may determine which A/B tests are running, and if this tuning variable is in an A/B test. The server may determine if this user is part of a user segment that was assigned to the A/B test. If the user is part of a user segment that was assigned to an A/B test that contained this variable, then the server may determine which variant the user had been assigned to and return to the client the value for that variant. The client then may use that value to offer the user the discount for purchasing the item.

Receiving data to modify the application with the tuning variable system may proceed as follows in some embodiments. A Client application may integrate the Client SDK The Client SDK may include code that makes it more convenient to communicate with the Tuning Variable System. The application may instruct the SDK to request one or more tuning variables from the Tuning Variable System. The Tuning Variable System may check to see if the requested tuning variable is part of an active experiment (aka test), as described in greater detail below. If the tuning variable is part of an experiment, then the Tuning Variable System may check to see if the variable has been assigned to a experiment variant. If the variable has been assigned to a experiment variant, then the value for that variant may be returned to the SDK. If the variable has not been assigned to a variant then the Entity Segmentation Service (which may also be called User Segmentation Service in some embodiments) may see if the entity (user, device, etc.) is part of a segment that is assigned to the experiment. If the entity is part of segment that is assigned to the experiment, then it may be assigned to a variant. The value for that variant may be returned to the SDK Entity (e.g., User) Segmentation System (6.6.2): Embodiments of ISOSM may dynamically assign application users to segments defined by dynamic rule sets that may include runtime stats produced by the data collection system. Here, for example, each user segment may contain a set of tuning variables and values that an application uses to modify the behavior of the application for that particular user segment. This system may provide a way for defining a set of entities (entities may be either users or devices in some examples) that meet a set of qualifying criteria. It then may provide this information to other systems so that the other systems can get information about whether a particular entity is in a particular entity segment. For example, the Experiment System may use an Entity Segment to determine if an Entity is qualified to participate in a particular experiment. A specific example may proceed as follows. Someone could use the web application to create a Entity Segment for users (i.e. a User Segment) having criteria including users who were new to the application within the last 14 days and had made a purchase. They might name this segment "New Users who purchase". Then they may want to run an experiment to determine the price sensitivity of these users for a particular item. They might then create a "Price Sensitivity" experiment using the Experiment System (aka Testing System or Multivariate Testing System) and only allow users in the "New Users who purchase" segment be part of the experiment.

Data Collection System (3.1) (6.2): Embodiments of ISOSM may also include a standard process, data format and protocol for recording user interactions in software applications that may store the resultant data in a format ideal for in-app processing in addition to creating an event log or stream for offline processing.

Testing or Experiment System (6.3): Embodiments of ISOSM may include or involve aspects that dynamically create user segments using combinations of tuning variables for the purpose of identifying a desirable combination for a given goal. The Experiment System may be used to run multivariate tests, A/B test experiments, multi armed bandit experiments, and in general any experiment involving a population of entities and some data to define the experiment. The experiment system may be used to manage experiments. It may determine which entities participate in experiments (for example by using the Entity Segmentation System). It may determine which entities are assigned to specific variants. It may also determine the experiment system contains the information that is needed by an experiment, such as the type of the experiment, the number of variants, the goal KPI, what tuning variables are associated with an experiment, and any other information that might be needed by a specific experiment.

In some embodiments, a software application on a computer may integrate the client SDK (4.1) into its software. The client SDK may include at least two parts: the Tuning variable API (4.1.2.2) and the Data API (4.1.1.1). The Data API may be used to record state, events, and properties from the application to the ISOSM system. The Tuning variable API may be used to retrieve information for an entity (e.g. user). Information that can be retrieved from the Tuning Variable API may include, but is not limited to, personalized values, user segment specific values, default values, demographics, and user specific values. Outbound Data Services may be provided by Data API (4.1.1.1). In some embodiments, the Data API may be a client side system to which an application may link. In other embodiments, the application may include the source code for the Data API. In one example, calls to the Data API may result in data being sent through the ISOSM Data Collection Service (3.1) and may ultimately end up in the event logs (2.1.3) for processing. In some embodiments, there may be at least three concepts in the Data API: entities, transactions, and properties. An application may start with a sessionStateOpen transaction, and may end the transaction with a sessionStateClose. Properties may be used to associate information directly with a transaction or entity (e.g. user or device). Furthermore, a transaction that starts and ends at the same time may be called an event.

An example Data API for a video game may be as follows:
1. sessionTransactionOpen
   a. preloadTransactionOpen
      i. eventTOS(accepted);
      ii. eventLogin(success);
      iii. setUserProperties(name, country, dob);
      iv. eventCustom(getFriends, complete);
      v. setUserFriends(friendsList);
   b. preloadTransactionClose
   c. loadTransactionOpen
      i. eventLoadProgress(0);
      ii. eventLoadProgress(0.25);
      iii. eventLoadProgress(0.50);
      iv. eventLoadProgress(1.0);
   d. loadTransactionClose
   e. gameTransactionOpen
      i. frontendTransactionOpen
          1. eventMenuClicked(startGame);
      ii. frontendTransactionClose
   f. gameTransactionClose
2. sessionTransactionClose The Data API may be part of the Client SDK and may be responsible for providing the application with an interface to communicate with the Data Collection Service. The Data API may optionally include other features such as the separation of game instrumentation and event descriptions, compression and buffering for reducing network load and support, and/or support for tools that may allow customers to refine event and state descriptions to provide additional information.

A data collection service may also be provided. In some embodiments, when event data reaches the Data Collection Service, a number of things may occur. The event data may be sent to a Stats System. If data transforms exist for the event being processed, the Stats Service may apply those transforms and save the resultant data in a production data store. In addition to sending data to stats for processing, the Data Collection Service may forward the raw event stream through a Telemetry Service for batch processing, data warehousing, and machine learning.

In some embodiments, data may be sent to the Data Collection Service as follows. The client application may integrate the SDK. The SDK may include code that makes it more convenient to communicate with the Data Collection Service. Data may be reported up to the Data Collection Service from the client application. The Data Collection service may temporarily store this data in a raw format. Then an ETL (extract, transform, and load) process may run algorithms on the data and put the output into the Descriptive Data Format. Then a "mart" process may transform the data into a format for reporting and store the transformed data into a SQL database. Finally, the web application may query the data from the SQL database and/or display it in reports Multi dimensional data representation may also be performed to limit or avoid data loss. When dealing with event streams generated by human interaction with an application, such as a web site or video game, a hierarchical approach to data representation may be used. When the descriptive model is generated it is created in the Descriptive Data Format. Events may be a special case of transactions where the transaction starts and ends at the same time. Transactions may have an "Open" event marking the beginning of the state and may have a "Close" event marking the end of a state. A transaction may have a maximum open time. Transactions may not be open longer then this maximum open time. In the case where a close event is not received before the timeout occurs, an implicit state close may be triggered, closing the transaction.

In addition to custom transactions, some embodiments of ISOSM may define a standard set of transactions. The use of standard transactions and events may provide a foundation for ISOSM to compare and generate insights across many applications. In this way, ISOSM may become more useful as more applications use it. The standard transactions may include, but are not limited to, session state information, preloading, loading, store, purchasing, and friend invites.

Enties (e.g. Users or Devices) may have properties associated with them. These properties may be calculated using a Data Transform (6.2.8) rule that may be defined in data and may be updated without interrupting the application or may be set by the application using the Data SDK. The Data Transform rule may define the relationship between an event, its value, and an actual runtime data element (if one exists). The Data Transform may also define the transform to apply to the event (or events) to calculate the final property. The final values may be stored in the Stats service. (6.2.4)

An example data transform may be as follows:
Energy Transform
   Event List
     Event 1
       Event Type: energy
       Event: earned
       Value Transform: add
     Event 2
       Event Type: energy
       Event: spent
       Value Transform: subtract Properties List
   EnergyPerSession
     Period: Session
     Transform: Average
   TotalEnergy
     Period: AllTime
     Transform: Add
   EnergyPerDay
     Period: Day
     Transform: Average In some implementations, user properties may be added to the transaction stream immediately after a "session open" transaction occurs to aid calculations during analysis. Additionally, user properties may be stored in the runtime environment to create user segments.

Figure 4:
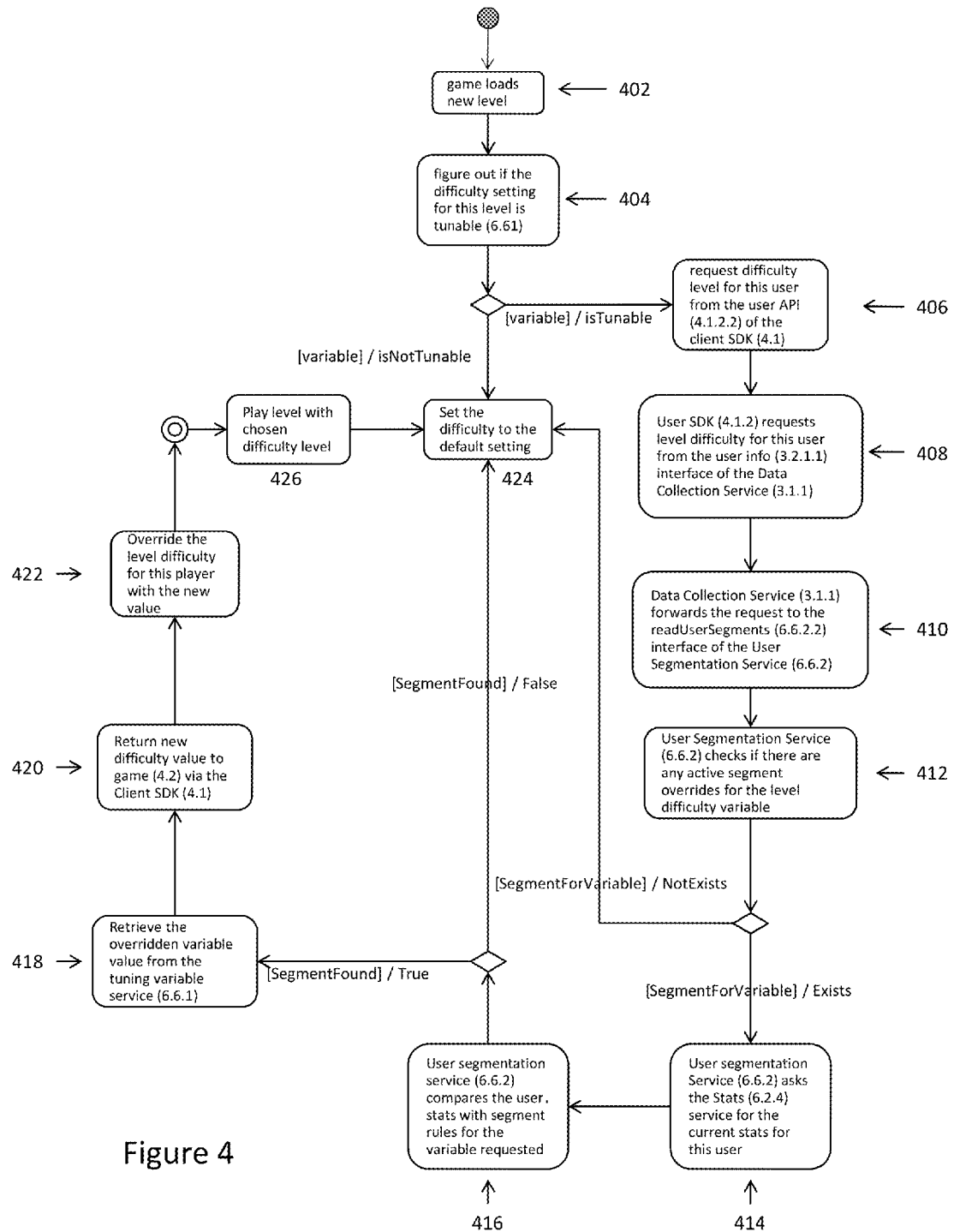
FIG. 4 is an exemplary flowchart of application difficulty tuning according to illustrative implementation(s) of the innovations herein.

Application properties may be defined by the Data Definition file structure(s). Such data structure(s) may contain additional details for a specific transaction type, transaction combination. This file may be updated without interrupting the flow of the application. Example uses of data definitions may include, but are not limited to, defining additional properties and requirements for quests in a video game, defining the color of the ok button in a dialog box, or defining the category, price, and name of items for sale in the store. FIG. 4 is a flowchart of an exemplary application difficulty tuning process according to illustrative implementation(s) of the innovations herein. FIG. 4 provides an example of how the Tuning Variables may work in combination with the Entity Segmentation Service (i.e., User Segmentation Service) to modify an application for a specific Entity Segment. Referring to FIG. 4, embodiments of ISOSM may load a new level (Step 402). The embodiments of ISOSM may figure out if the difficulty setting for this level is tunable (6.6.1) (Step 404). If this level is not tunable, then the embodiments of ISOSM may set the difficulty to the default setting (Step 424). The embodiments of ISOSM may play a level with the chosen difficulty level (Step 426). If this level is tunable, then the embodiments of ISOSM may request a difficulty level for this user from the user API (4.1.2.2) of the client SDK (4.1) (Step 406). The User SDK (4.1.2) may request level difficulty for this user from the user info (3.2.1.1) interface of the Data Collection Service (3.1.1) (Step 408). The Data Collection Service (3.1.1) may forward the request to the readUserSegments (6.6.2.2) interface of the User Segmentation Service (6.6.2) (Step 410). The User Segmentation Service (6.6.2) may check if there are any active segment overrides for the level difficulty variable (Step 412). If active segment overrides for the level difficulty do not exist, then the embodiments of ISOSM may set the difficulty to the default setting (Step 424).

Further, the embodiments of ISOSM may play a level with the chosen difficulty level (Step 426). If active segment overrides for the level difficulty exist, then the User Segmentation Service (6.6.2) may ask the Stats (6.2.4) service for the current stats for this user (Step 414). The User Segmentation Service (6.2.2) may compare the user stats with segment rules for the variable requested (Step 416). If the segment is not found, then the embodiments of ISOSM may set the difficulty to the default setting (Step 424). The embodiments of ISOSM may play a level with the chosen difficulty level (Step 426). If the segment is found, then the embodiments of ISOSM may retrieve the overridden variable value from the tuning variable service (6.6.1) (Step 418). The embodiments of ISOSM may return a new difficulty value to the game (4.2) via the Client SDK (4.1) (Step 420). The embodiments of ISOSM may override the level difficulty for this player with the new value (Step 422).

Optimization Process Description

Figure 5:
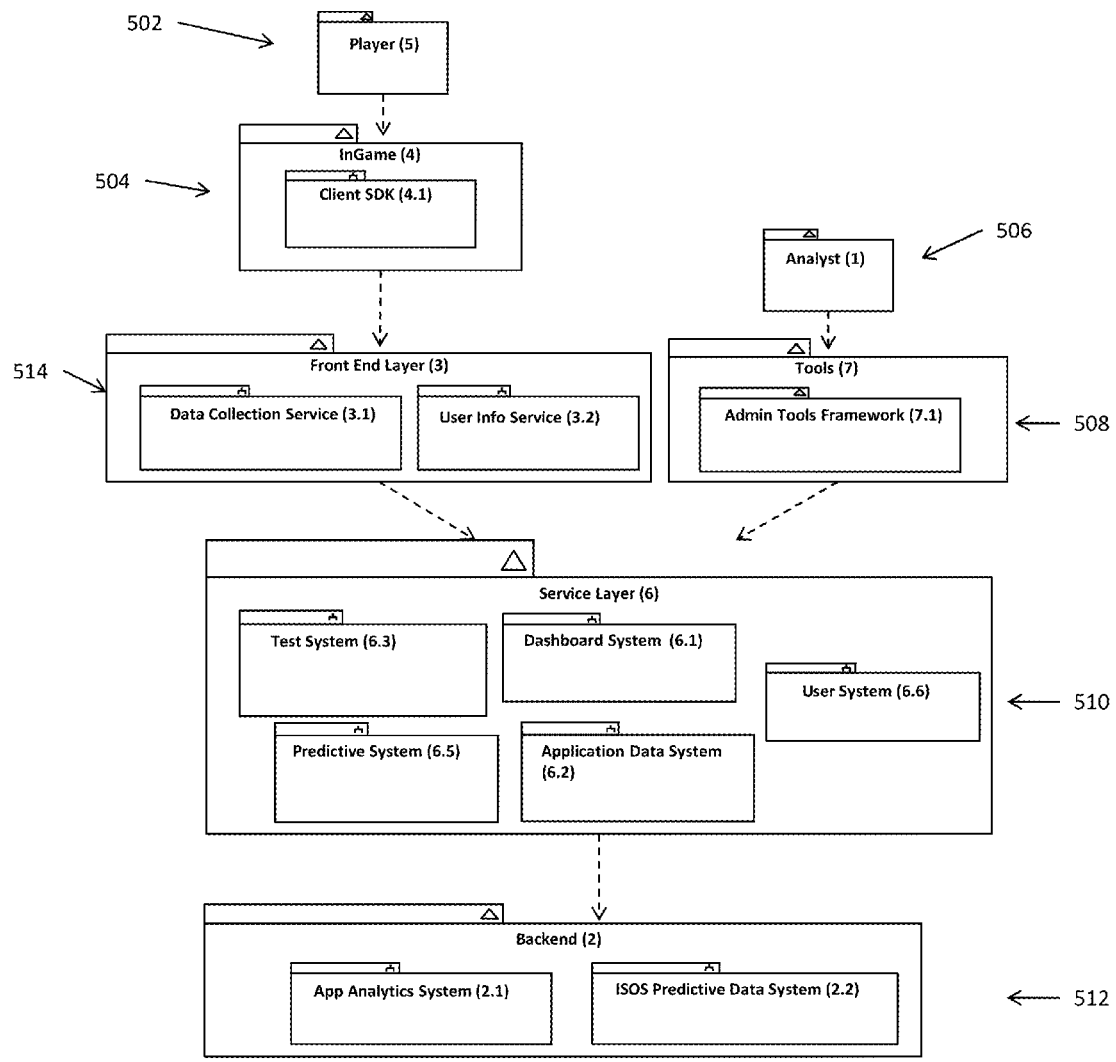
FIG. 5 is an exemplary block diagram of an application optimization system according to illustrative implementation(s) of the innovations herein

FIG. 5 relates to an overview of an illustrative optimization system/structure, while FIG. 6 through FIG. 9 provide further details thereof. FIG. 5 is an exemplary block diagram of components of an application optimization system according to illustrative implementation(s) of the innovations herein. Referring to FIG. 5, a player 502, the game component 504, the front end layer 514, analyst 506, a tools component 508, service layer components 510, as well as backend components 512 are shown.

Figure 6:
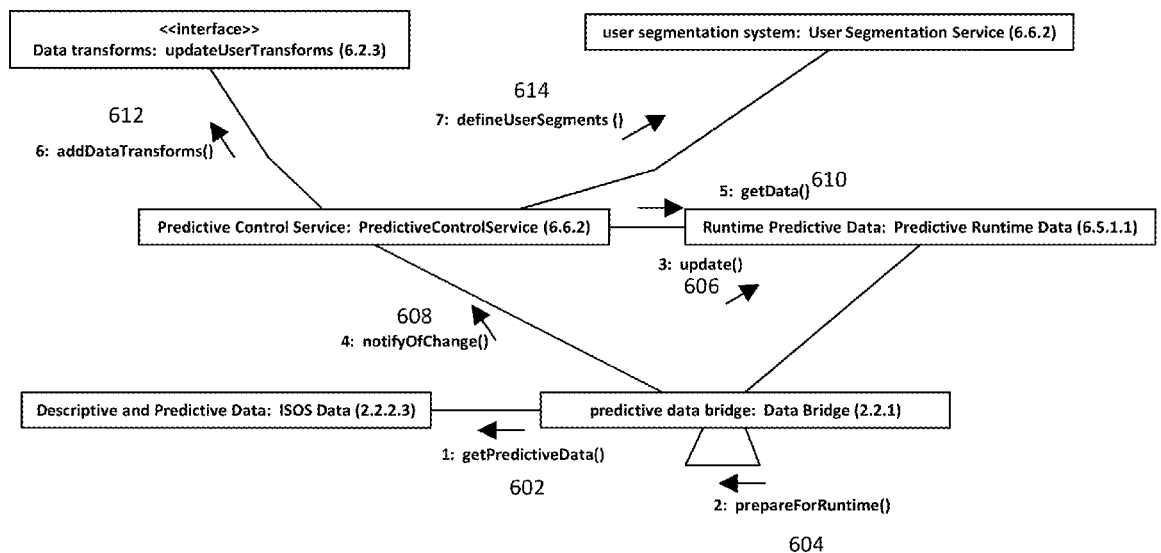
FIG. 6 is an exemplary block diagram of a predictive control system according to illustrative implementation(s) of the innovations herein.

FIG. 6 is an exemplary block diagram of a predictive control system according to illustrative implementation(s) of the innovations herein. FIG. 6 illustrates some main portion of the predictive system and interactions of components, according to some implementations. Referring to FIG. 6, the Predictive Data Bridge (e.g., Data Bridge (2.2.1)) may first give a call to get predictive data from the Descriptive and Predictive Data (e.g., ISOS Data (2.2.2.3)) at 602. The Predictive Data Bridge (e.g., Data Bridge (2.2.1)) may prepare for the Runtime at 604. Then, processing may proceed along one of two courses at 608 or 606. The Predictive Data Bridge (e.g., Data Bridge (2.2.1)) may convert the predictive data into the Runtime Predictive Data (e.g., Predictive Runtime Data (6.5.1.1)) at 606. The Predictive Data Bridge (e.g., Data Bridge (2.2.1)) may notify of change to the Predictive Control Service (e.g., Predictive Control Service (6.5.2)) at 608.

The Predictive Control Service may include three features, e.g., at 610, 612, or 614. The Predictive Control Service (e.g., PredictiveControlService (6.5.2)) may make a call to use the runtime predictive data at 610. The Predictive Control Service (e.g., PredictiveControlService (6.5.2)) may make a call to add data transforms to Data Transforms (e.g., updateUserTransForms (6.2.3)) at 612. The Predictive Control Service (e.g., PredictiveControlService (6.5.2)) may make a call to define user segments in User Segmentation System (e.g., User Segmentation Service (6.6.2)) at 614.

Figure 7:
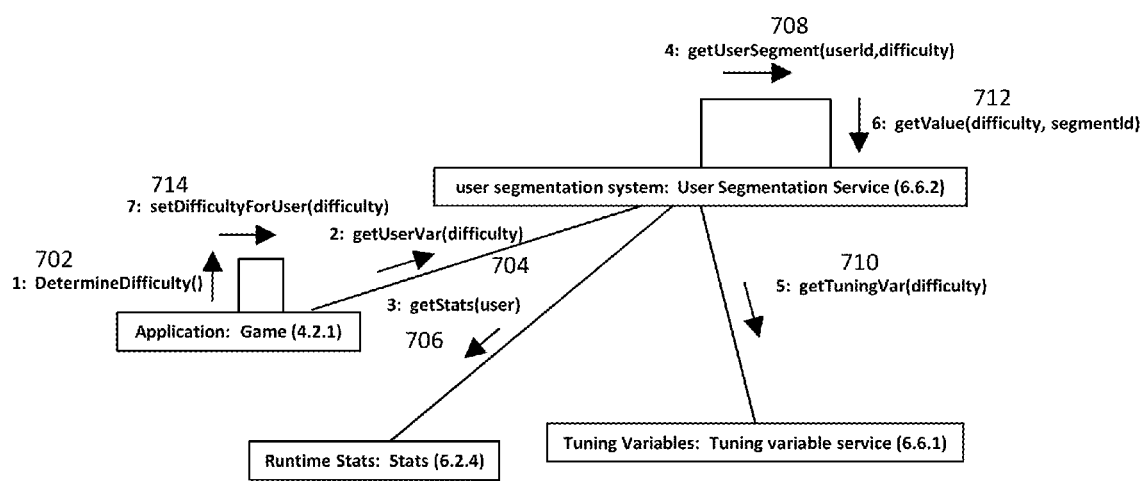
FIG. 7 is an exemplary block diagram of a user segmentation system according to illustrative implementation(s) of the innovations herein.

FIG. 7 is an exemplary block diagram of a user segmentation system according to illustrative implementation(s) of the innovations herein. This particular example is showing the user segmentation system being used for adjusting difficulty. Referring to FIG. 7, an application may determine difficulty at 702, and may set difficulty for users at 714. The User Segmentation System (e.g., User Segmentation Service (6.6.2)) may include three features in connection with other systems, e.g, at 704, 706, and 710. The User Segmentation System (e.g., User Segmentation Service (6.6.2)) may make a call to get user variables (e.g., difficulty) from an application (e.g., Game) at 704. The User Segmentation System (e.g., User Segmentation Service (6.6.2)) may make a call to get user stats from the Runtime Stats (e.g., Stats (6.2.4)) at 706. User Segmentation System (e.g., User Segmentation Service (6.6.2)) may make a call to get difficulty tuning variable from the Tuning Variables (e.g., Tuning Variable Service (6.6.1)) at 710.

In addition, the User Segmentation System (e.g., User Segmentation Service (6.6.2)) may include two features in itself, e.g., at 708 and 712. The User Segmentation System (e.g., User Segmentation Service (6.6.2)) may make a call to get user segments including a user ID and difficulty at 708. The User Segmentation System (e.g., User Segmentation Service (6.6.2)) may also make a call to get values including difficulty and a segment ID at 712.

Figure 8:
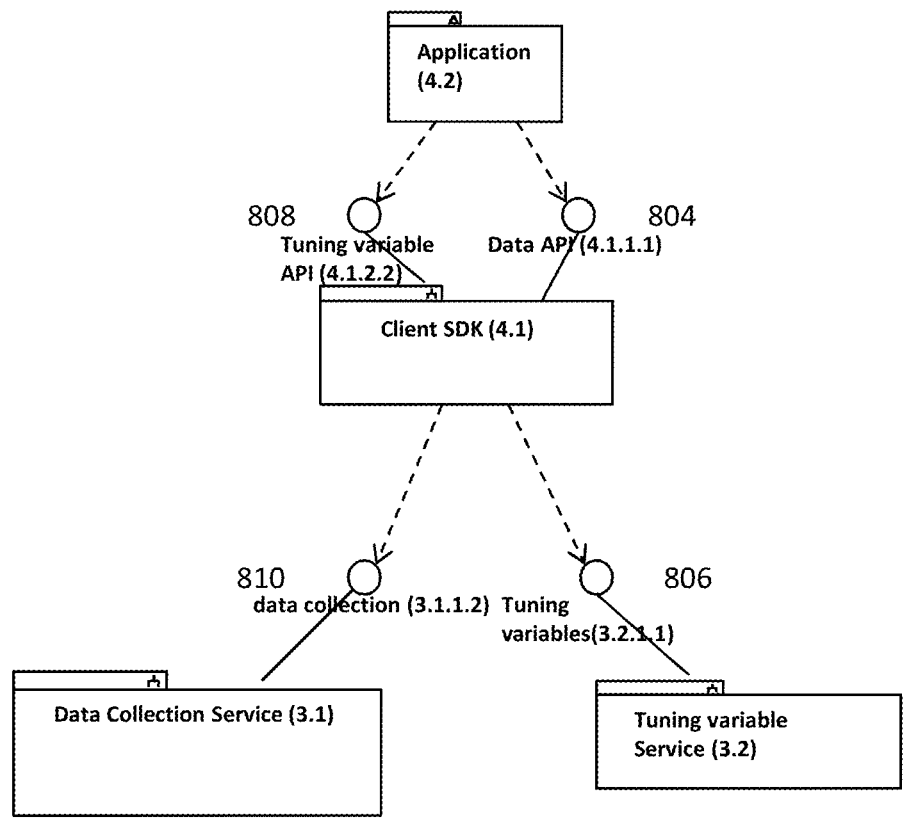
FIG. 8 is an exemplary block diagram of a data collection system according to illustrative implementation(s) of the innovations herein.

FIG. 8 is an exemplary block diagram of a data collection system according to illustrative implementation(s) of the innovations herein.

This shows the two main ways that the Application interacts with the system through the Client SDK. It sends data to the Data Collection Service and it receives data from the Tuning Variable Service. The Application sends data to the Data API of the Client SDK at 804. The Client SDK may buffer this data to optimize network communication or to handle network connectivity issues. The Client SDK then sends this data to the Data Selection Service at 810. The Application retrieves tuning variables using the Tuning Variable API from the client SDK at 808. The Client SDK retrieves the specified Tuning Variables from the Tuning Variable service at 806. The Client SDK may buffer the tuning variables to optimize network communication.

Figure 9:
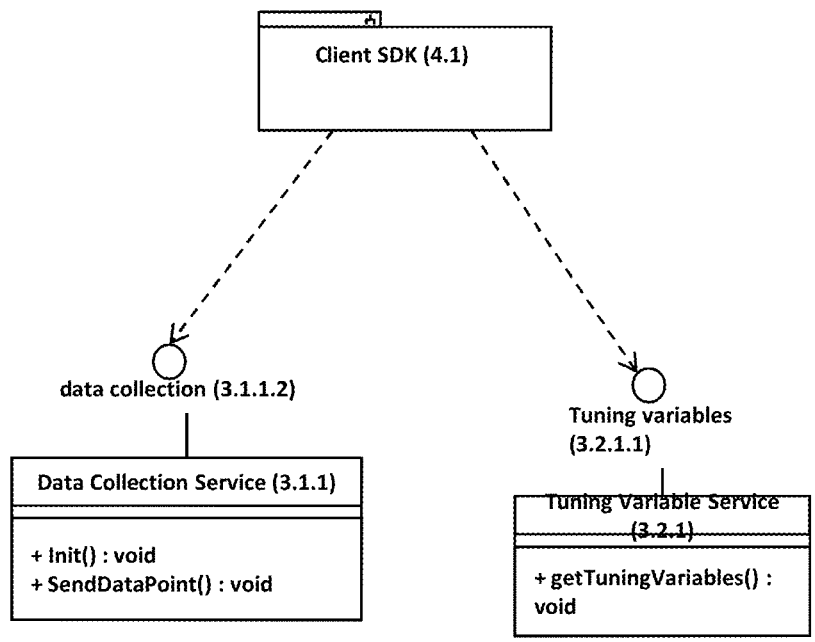
FIG. 9 is an exemplary block diagram of a client SDK for the application optimization system according to illustrative implementation(s) of the innovations herein.

FIG. 9 is an exemplary block diagram of a data collection system according to illustrative implementation(s) of the innovations herein.

This figure provides further detail on the client SDK and the primary methods that would be called by the application.

Figure 10:
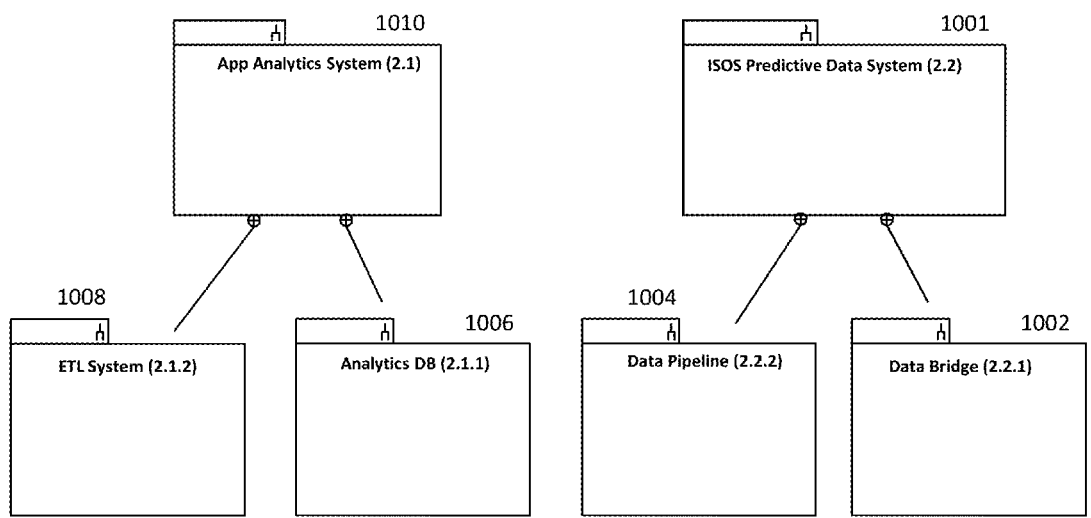
FIG. 10 is an exemplary block diagram of a predictive data system according to illustrative implementation(s) of the innovations herein.

FIG. 10 is an exemplary block diagram of a predictive data system according to illustrative implementation(s) of the innovations herein.

The App Analytics system at 1010 uses the ETL System at 1008 to transform the Log Files into the Descriptive Data Format that is stored in the Analytics DB at 1006. The ISOS Predictive Data System at 1001 uses the Data Bridge at 1002 to access the Analytics DB at 1006. It uses the Data Pipeline at 1004 to create create Predictive Models, to identify Predictive Clusters, to identify Valuable clusters or other Predcictive work. For more of the Data Pipeline see FIG. 16.

As noted above, a back office process may be provided, as illustrated in part in FIG. 3, for example.

In some embodiments, the entire process may be divided into two sections: unsupervised, and supervised. ISOSM may build, refine, and fundamentally understand the data using unsupervised learning techniques. Using this knowledge it may be capable of answering questions using supervised machine learning techniques quickly.

The Data Pipeline may take in game data and may produce a descriptive (2.2.2.4) and predictive (2.2.2.4) database. These databases may be used by the report generation system (2.2.4) to generate reports. The databases may also be used by the data bridge (2.2.1) to transform the data into a production ready format that games can use to update statistics gathering (6.2.4) and create dynamic predictive user segments (6.5.1). The Data Pipeline (2.2.2) may also provide scalability, big data capabilities, the ability to identify outliers, full automation capabilities, and/or the ability to identify non-linear relationships.

The Data Pipeline (2.2.2) may use many technologies to produce the final descriptive database (2.2.2.4). These technologies may include, but are not limited to, PHP, MySQL, Hadoop, Hadoop Streaming SDK, Amazon Elastic Map Reduce, Amazon RedShift, and Amazon S3 storage.

In some embodiments, the descriptive process may take as input either a log file or an analytics database, and may produce a cleaned-up, discrete representation of the data which may be analyzed for exploratory purposes or used for predictive analysis. This process may be described as a sequence of steps that may take as input the game analytics database (2.1.1) or raw event stream (6.2.1) and produce the descriptive database.

In one example process, the system may dump the initial data from a database to a text file ready for processing. It may do this by connecting to the analytical database (2.1.1), running a pre-defined query, and writing the results out to a tab separated file. In a case where the raw event stream is being analyzed instead of an application analytics database, this action may perform any necessary transforms to the event stream to produce a tab-separated file that is ready for further processing. This may be done by the ISOSM Control Service (2.2.2.2) since it may not have any big data requirements at this time. The final result may be uploaded to a distributed remote file system to be made available for consumption as described below.

A codebook may next be produced. The codebook may be used to transform continuous variables into discrete ones. The more discrete values that are created per variable may increase the required processing resources in future steps. Additionally, if too few discrete values are created per variable, the fidelity of the information may be lost, and outliers may be "averaged out". In some embodiments, this codebook creation may be started and monitored by the ISOSM Control System. As the data processing requirements may be high, the actual codebook generation may be done in a Hadoop cluster. Some embodiments may utilize or involve a Chi Merge algorithm for discretization. As a function of the format of the inputs and outputs of this process, however, other discretization techniques may also be used.

After the codebook is generated, the raw data generated as described above may be encoded using the rules defined in the codebook. In one example, this step may run entirely on Hadoop. It may take as input the codebook and the raw data, and may produce an encoded file, which may contains an id, raw value, and encoded value, for example. As the raw data is analyzed, a data type may be derived and assigned to each variable based on a sampling of the first N values (where N is configurable). Valid data types may include, but are not limited to, string, numeric, and other. Only variables of type numeric may be encoded. Variables of type string and other may be written to the encoded file with the encoded values set to the same value as the raw values.

Figure 11:
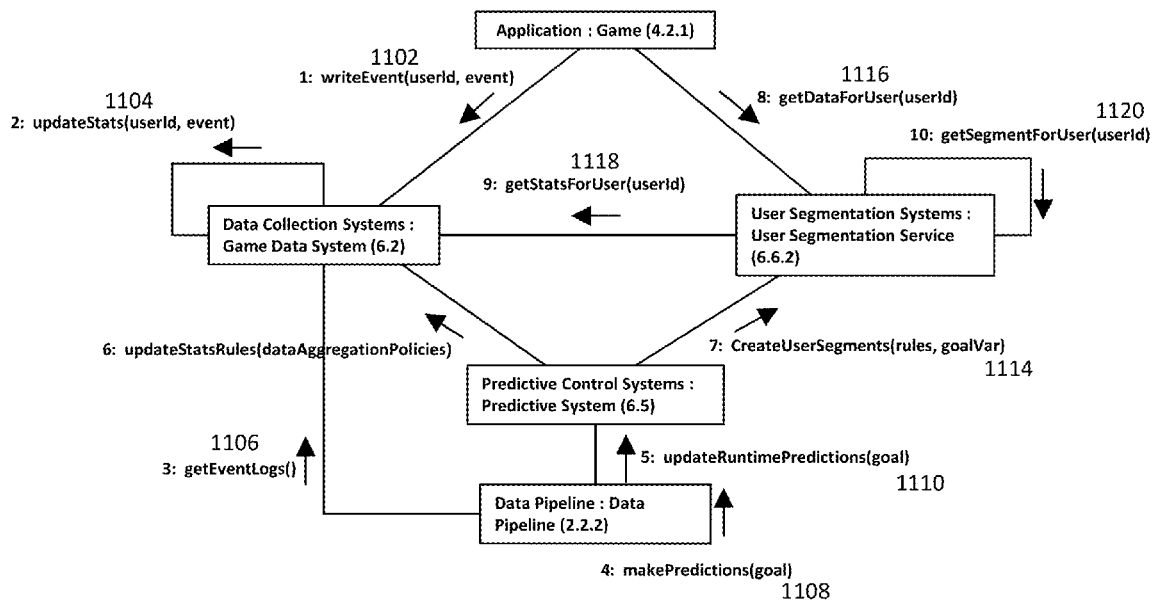
FIG. 11 is an exemplary block diagram of an application optimization system according to illustrative implementation(s) of the innovations herein.

FIG. 11 is an exemplary block diagram of an application optimization system according to illustrative implementation(s) of the innovations herein. Referring to FIG. 11, the Data Collection Systems (e.g., Game Data System (6.2)) may make a call to an application (e.g., Game (4.2.1)) to write event streams including a user ID and an event at 1102. In response to the input from the application, the Data Collection Systems (e.g., Game Data System (6.2)) may update the Stats including a user ID and an event at 1104. The Data Collection Systems (e.g., Game Data System (6.2)) may also make a call to the Data Pipeline (e.g., Data Pipeline (2.2.2)) to get event logs at 1106. The Data Pipeline (e.g., Data Pipeline (2.2.2)) may then make predictions. Next, the Data Pipeline (e.g., Data Pipeline (2.2.2)) may an update of the Runtime Predictions to the Predictive Control Systems (e.g., Predictive System (6.5)) at 1110.

Then, the Predictive Control Systems (e.g., Predictive System (6.5)) may perform two functions, e.g., at 1112 or 1114. The Data Collection Systems (e.g., Game Data System (6.2)) may make a call to the Predictive Control Systems (e.g., Predictive System (6.5)) to update the Stats Rules (e.g., data aggregations policies) at 1112. The Data Collection Systems (e.g., Game Data System (6.2)) may make a call to the User Segmentation Systems (e.g., User Segmentation Service (6.6.2)) to create the User Segments including rules and goal variables at 1114. Further, the User Segmentation Systems (e.g., User Segmentation Service (6.6.2)) may get data for a user including a user ID from the Application (e.g., Game (4.2.1)) at 1116. Additionally, the User Segmentation Systems (e.g., User Segmentation Service (6.6.2)) may send the Stats for a user including a user ID to the Data Collection Systems (e.g., Game Data System (6.2)) at 1118. The User Segmentation Systems (e.g., User Segmentation Service (6.6.2)) may get a segment for a user including a user ID at 1120.

Figure 12:
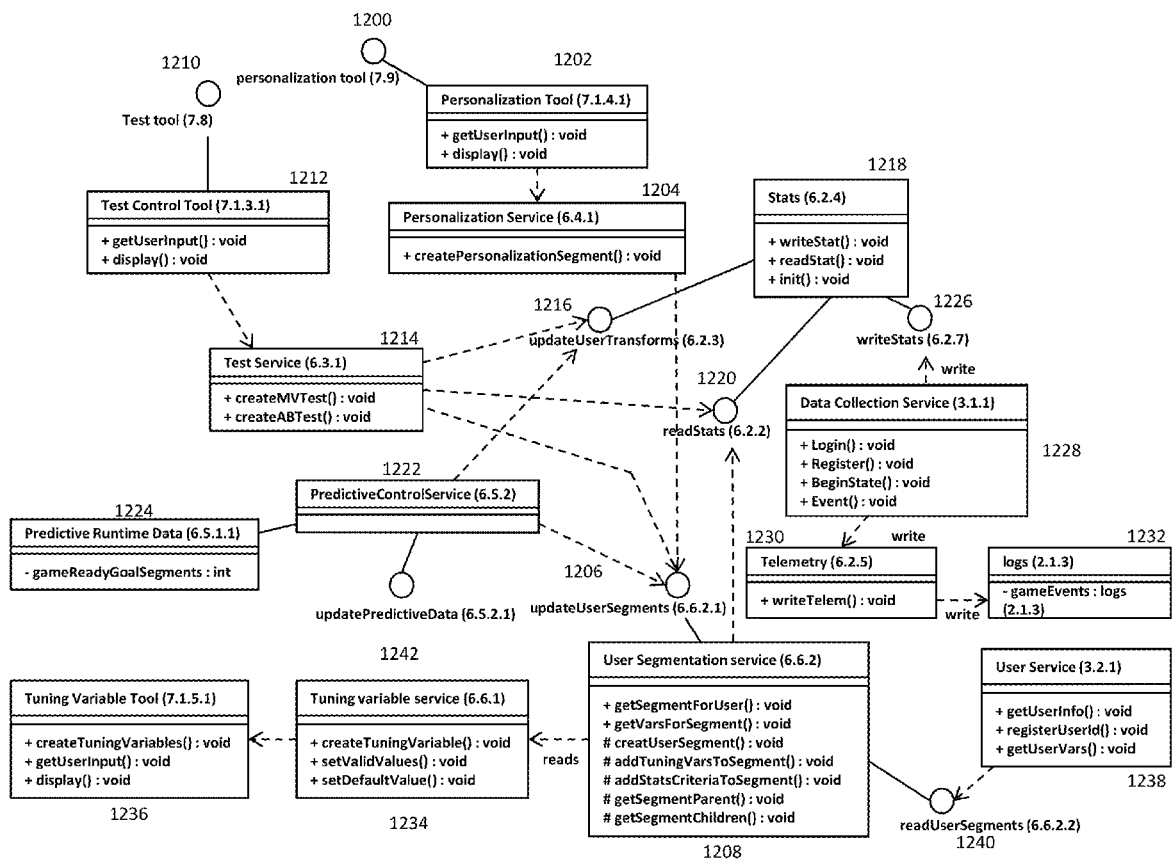
FIG. 12 is an exemplary block diagram of an application optimization system according to illustrative implementation(s) of the innovations herein.

FIG. 12 is an exemplary block diagram of an application optimization system according to illustrative implementation(s) of the innovations herein. FIG. 12. illustrates main components in the ISOSM system. In some implementations, the ISOSM system may access the Tuning Variable Service without going through the User Segmentation Service.

In operation, the Personalization Tool (7.9) allows an operator to create, modify, update or control Personalization Segments using the Personalization Service (6.4.1) at 1202. Further, the Test Tool (7.8) allows an operator to create, modify, update or control Tests using the Test Service (6.3.1) at 1214. The Test Service (6.3.1) at 1214 may read stats data calling readStats (6.2.2) as 1220, update user transforms calling updateUserTransforms (6.2.3) at 1216 or updateUserSegments (6.6.2.1) at 1206. The Predictive Runtime Data (6.5.1.1) at 1224 contains the predictive models and related data. The PredictiveControlService (6.5.2) at 1222 uses the Predictive RuntimeData (6.5.1.1) at 1224 to update user transforms using updateUserTransforms (6.2.3 at 1216) or updating user segments (6.6.2.1) at 1206. According to further processing, the Data Collection Service (3.1.1) may make a call to write the writeStats (6.2.7) to update values in Stats (6.2.4) and the Telemetry (6.2.5) at 1230. Then, the Telemetry (6.2.5) may write the logs (2.1.3) at 1232. The User Service (3.2.1) may read user Segments (6.6.2.2) from the User Segmentation Service (6.6.2) at 1208. The Tuning Variable Tool (7.1.5.1) at 1236 allows an operator to create, modify, or control Tuning variables using the Tuning Variable Service (6.6.1), at 1234. These Tuning Variables may be read from the Tuning variable service (6.6.1) by the User Segmentation Service (6.6.2).

Figure 13:
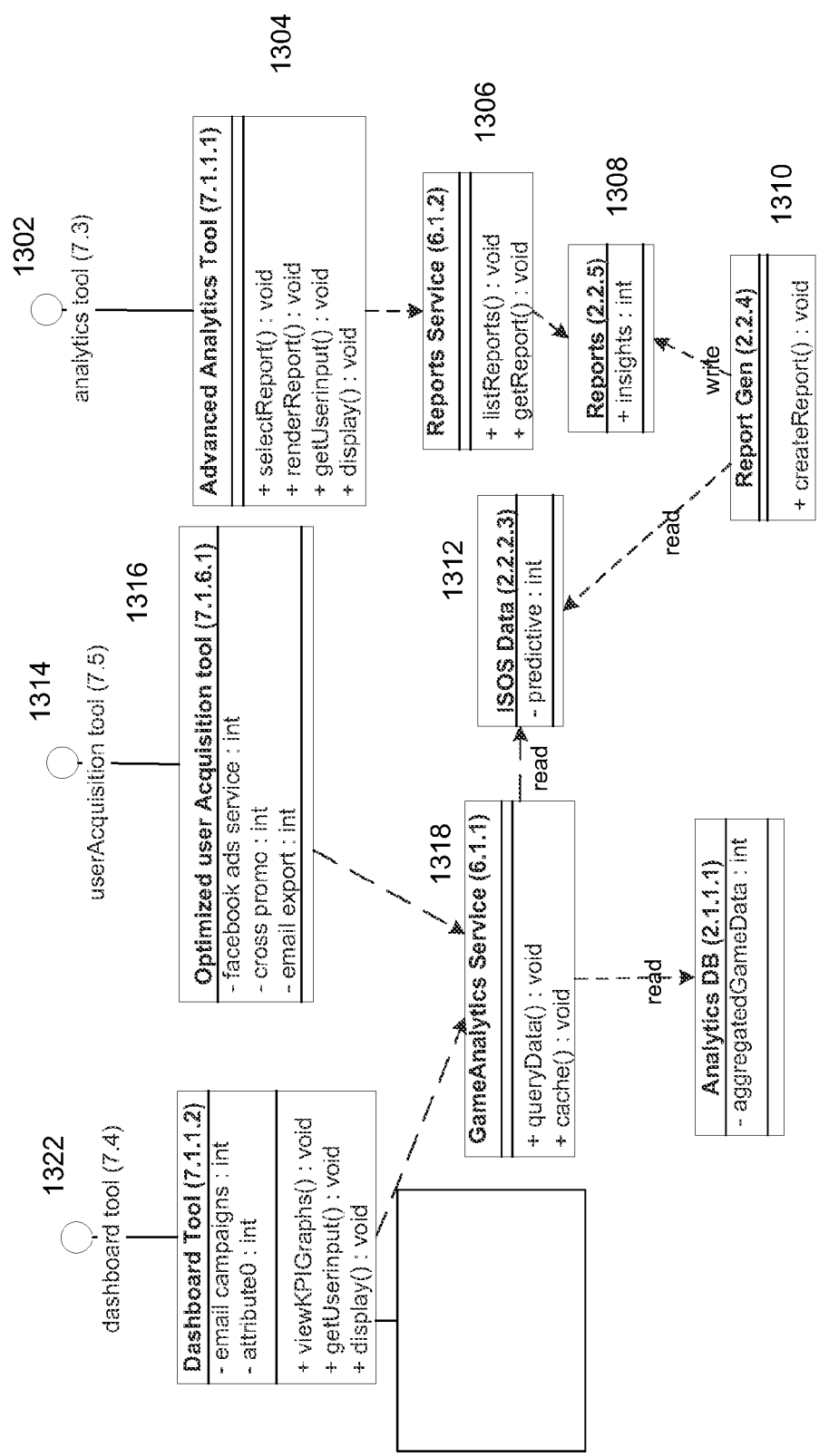
FIG. 13 is an exemplary diagram of a analytics service according to illustrative implementation(s) of the innovations herein.

FIG. 13 is an exemplary diagram of a analytics service according to illustrative implementation(s) of the innovations herein.

An operator uses the Optimized User Acquisition Tool at 1316 to setup Ad campaigns. The Optimized User Aquistion Tool uses the Game Analytics Service at 1318 to determine which user segments would respond best to particular campaigns. The Game Analytics Service uses the Analytics DB at 1320 to retrieve the data to perform that analysis.

The analytics tool at 1302 may consist of an Advanced Analytics Tool at 1304. The Advanced Analytics Tool may take user input from the operator and use that to display a particular report to the operator. The report may be retrieved from the Reports Service at 1306 The Reports Service may have a list of Reports at 1308 that we created by Report Gen at 1310. Report Gen may have used predictive data from ISOS Data at 1312 to create the report. The ISOS Data at 1312 may have used the Game Analytics Service at 1318 to data from the Analytics DB at 1320 and create the predictive data.

Figure 14:
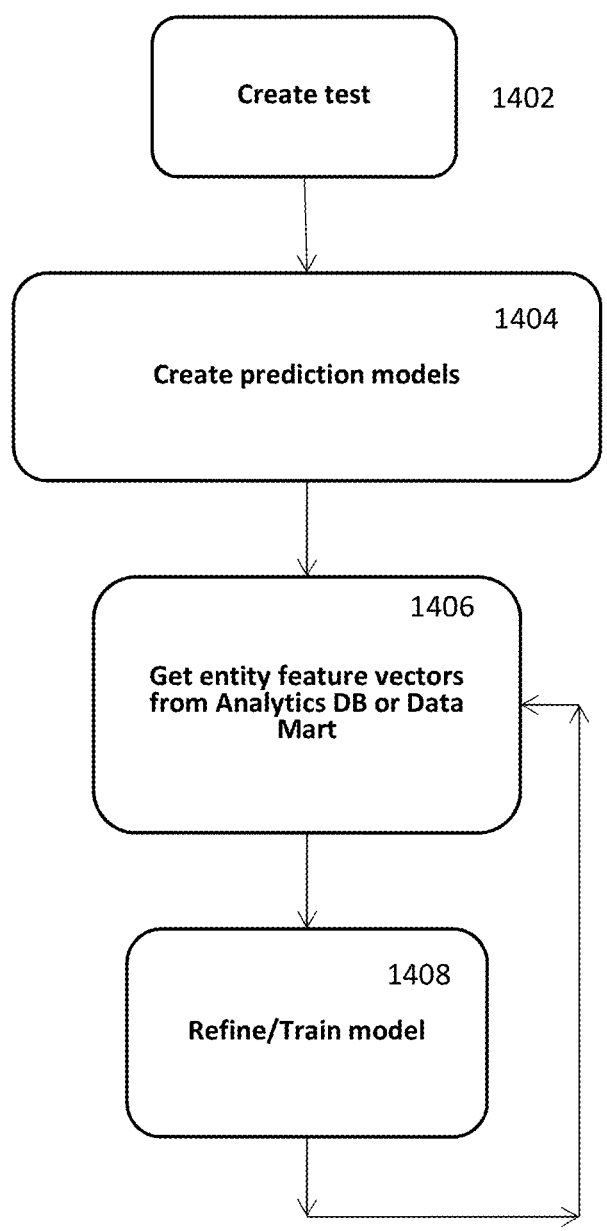
FIG. 14 is an exemplary flowchart of prediction model creation according to illustrative implementation(s) of the innovations herein.

FIG. 14 is an exemplary flowchart of prediction model creation according to illustrative implementation(s) of the innovations herein. This example shows how a test that uses a prediction model would work. An operator would set the proper settings and instruct the system to create a test at 1402. The Test Service would call the Predictive Control Service to create the prediction models at 1404. The Predictive Control Service would get the entity feature vectors from the Analytics DB or Data Mart at 1406 using the Predictive Data Bridge. The Predictive Control Service would refine and train the model at 1408. The Predictive Control System would repeat this process of getting feature vectors and refining/training the Predictive Model as appropriate for that model type. This may only occur during a model training phase, or it may continue for the lifetime of the Predictive Model.

The above represents one example of the descriptive data generation process. Throughout the process, a number of steps may be broken down into a series of map reduce methods, any or all of which may produce output files. These output files may be kept as part of the descriptive database. An additional output that may be involved is the frequency table that is produced as a requirement of the algorithm used to generate the codebook.

In some embodiments, once the Descriptive Data has been generated, multiple predictions may be run using the Descriptive Data as input. One example outcome of this Predictive Process may be to build a database of "interesting user segments" with relation to a goal chosen by the customer. Here, a goal may be defined as a conditional sentence using a constant, a field, and a conditional. For example, a goal may be defined as "level>5", or "moneySpent>0", or "DayOneRetention=true". The database output of the Predictive Process may be used by many systems to optimize an application. Predictive Data may be used by the dashboards, reports, and the data bridge, which produces the in-game predictive data, for example. The in-game predictive data may be used by the predictive controller to create dynamic segmentation rules (6.6.2) and data transform rules (6.2.8).

First a Predictive Process may determine which field combinations will be searched for patterns. A configuration file specifying the combination rules may be input, and a file containing each combination that meets the criteria specified by the rules may be produced. Here, for example, rules may include various categorizations such as: "Everything", "N States, M Behaviors", "Predefined List", etc In some embodiments, regardless of the rule chosen, an "elimination pass" may be performed that removes all combinations that have no chance of being predictive given the goal of the prediction. The "Everything" rule may write out every permutation of every variable in the data set. This may be included for very small data sets with few variables. "N States, M Behaviors" may combine every permutation of N "state" variables and every permutation of M "behavior" variables. Fields may be assigned a type (state, or behavior) in the configuration file. This may be the default mode of behavior in some embodiments. The "Predefined List" rule may take as input a list of field combinations and may write them to the output file. This may take place in the ISOSM Control System, though the systems and methods described herein are not limited by the particular locus of such features in the examples set forth herein.

After the list of combinations is generated, the Predictive Process may cluster the encoded data by combining every possible value of every variable in a combination, for example. The cluster definitions may be written out and assigned a unique identifier. Every unique entity (e.g., users) in the encoded file may be assigned to a cluster using based on exact match. This technique may allow for the combination of continuous and discrete data, avoids normalization, and may not require that any of the variables being checked are correlated. This encoding may be computationally intensive and may be performed exclusively on Hadoop. In some cases the number of processing nodes in Hadoop may be increased to perform this processing.

The Predictive Process may then calculate an average goal pass rate (aka Population KPI) for the entire population. The predictive goal may be input, and a single number by dividing the number of elements that meet the goal criteria by the total population of users may be produced. Once the population KPI is generated, the same process may be applied to each cluster (as defined above) and a cluster KPI score may be assigned to each cluster.

Then, the example Predictive Process may identify the "interesting" clusters. Interesting clusters may be those clusters that may be investigated further to determine whether or not they are predictive for the goal given. An "interesting" cluster may be a cluster that has a high probability of not being random. The probability score may be generated using the Chi2 method of statistical significance for example, and the high probability required to mark a cluster as interesting may be a threshold value defined in a configuration file for example.

Next, the Predictive Process may attempt to identify which of the "interesting clusters" are predictive. This may be done by selecting a "test data set" (as defined by a configuration file for example), which may be encoded, clustered, and assigned cluster KPIs using the rules generated by the training set. Statistical significance may be used to determine if a cluster is predictive by comparing clusters from the training set to the equivalently defined clusters formed by the test set. If the significance is greater then a given threshold (as defined by a configuration file for example), the cluster may considered predictive and may be marked as such.

Given a list of predictive clusters, the Predictive Process may calculate an opportunity for each cluster. "Opportunity" may be defined as the change to the population KPI that would happen if all elements that are not in the predictive cluster but can reasonably be migrated to the predictive cluster were to move to the predictive cluster. Further, this information may be written out as part of the predictive database.

In some embodiments, the accuracy of the predictions may be calculated. This calculation may use standard K-Fold validation, for example, and may average the results of each run to produce the predictive score. The number of folds to use may be given in a configuration file for example.

Figure 15:
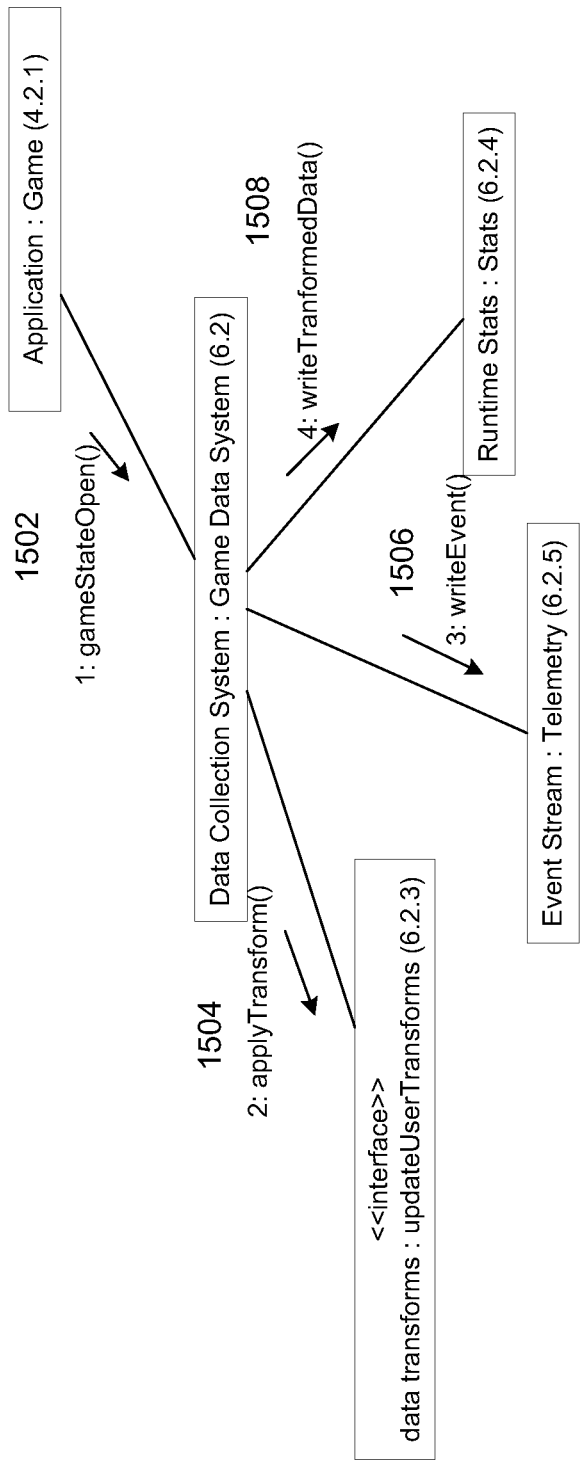
FIG. 15 is an exemplary block diagram of a data collection system according to illustrative implementation(s) of the innovations herein.

FIG. 15 is an exemplary block diagram of a data collection system according to illustrative implementation(s) of the innovations herein.

The Application at 1502 may send data to the Data Collection System at 1508. The Data Collection system may write data to the Event Stream (event logs) at 1506. The Data Collection System my apply a data transform to the data by calling updateUserTransforms (6.2.3). The Data Collection System may also write the transformed data to Runtime Stats at 1508.

Figure 16:
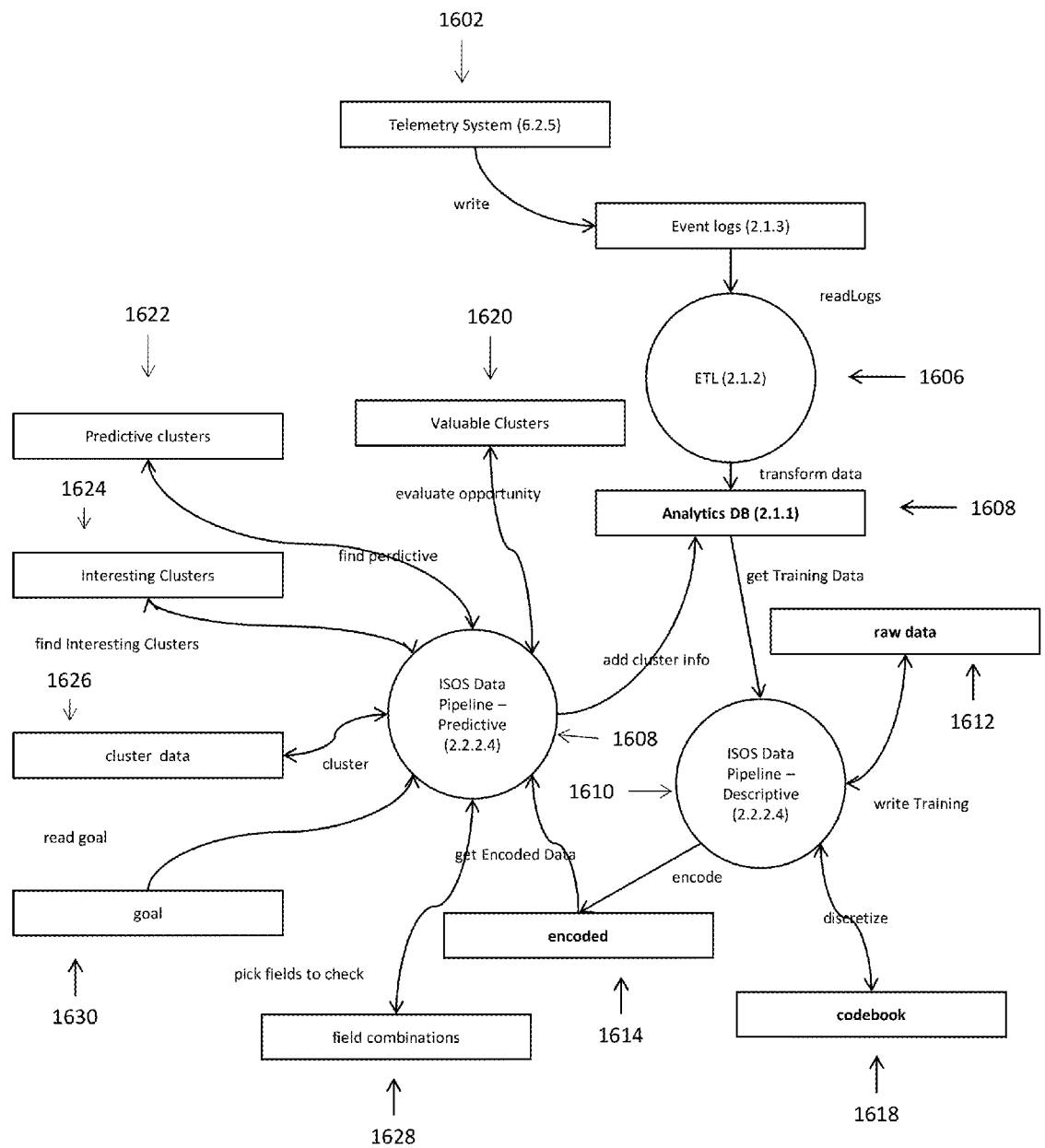
FIG. 16 is an exemplary diagram of a predictive data pipeline system according to illustrative implementation(s) of the innovations herein.

FIG. 16 is an exemplary diagram of a data pipeline system according to illustrative implementation(s) of the innovations herein.

The Telemetry System at 1602 may write data to the Event Logs (2.1.3). The Event logs may then be transformed into the Descriptive Data Format by the ETL (2.1.2) process at 1606 and stored into the Analytics DB (2.1.1) at 1608. The ISOS Data Pipline—Descriptive at 1610 may then use the data from the Analytics DB. It may read and write training data as raw data at 1612. It may create a codebook at 1618. And it may create encoded version of data at 1614. The ISOS Data Pipeline Predictive at 1608 may get data from the Analytics DB (2.1.1) or from the encoded data at 1614. It may then pick fields to check at 1628. It may have a goal that it uses for predictions that it reads at 1630. It may then cluster data according to similar characterestics at 1626. Once it has created cluster data at 1626 it may find interesting clusters at 1624, find predictive clusters at 1622 or identify valuable clusters at 1620. It many then store a predictive model, or data about cluster definition, interest, predictive accuracy, value, or other characteristic to the Analytics DB at 1608.

An example of how several of the systems described above may be used in an test where the goal is to optimize for revenue by choosing the optimal discount to provide to each user may proceed as follows. The Test Service may request that the Runtime Data Bridge create a number of predictive models that correspond to the number of possible discounts that are being considered in the experiment. As part of a training phase, the Test Service may assign users to each variant of possible discounts and gather data using the Data Collection System (which may result in data in the Analytics DB in the Descriptive Data Format). The system may then use a boosting algorithm using data from the Analytics DB to create a predictive model to predict the likelihood that a user may purchase an item given a specific variant. (This may be the Predictive Data Transformation controlled by the Runtime Data Bridge). At some point the Prediction Control System may determine that the initial training has completed and the models are available for use. After this, when an individual user interacts with the application, the Prediction Control System may retrieve the predictive models using the Runtime Data Bridge and use them along with the user's data from the Data Warehouse to calculate a likely revenue generated by that user from each of the variants. The Test Service may then assign the user to the variant that has the highest likely revenue.

Figure 17:
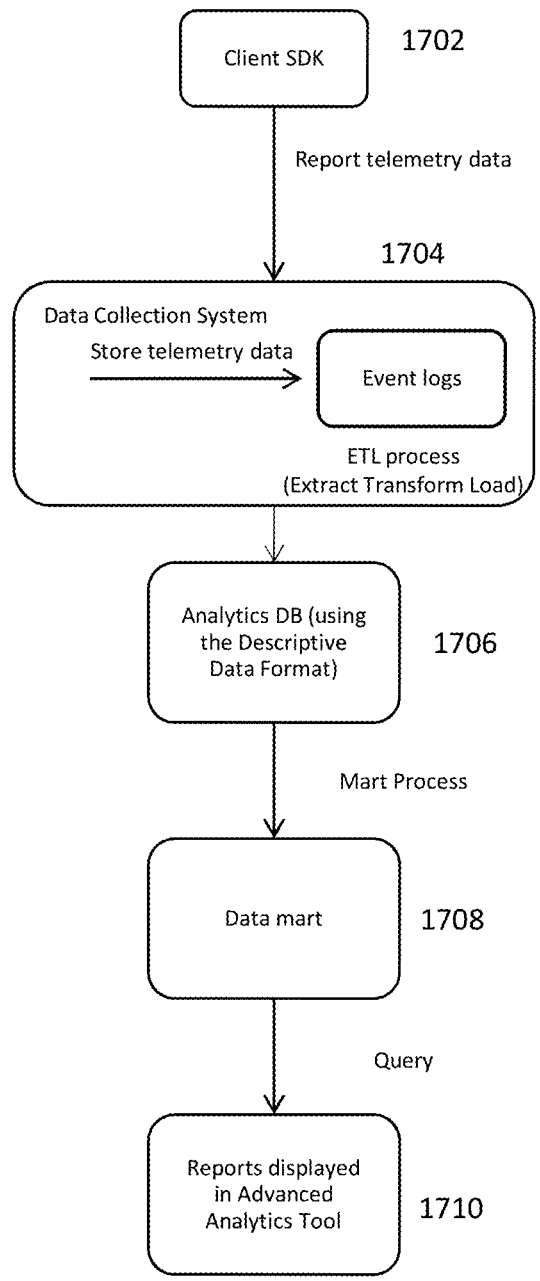
FIG. 17 is an exemplary flowchart of a data collection system according to illustrative implementation(s) of the innovations herein.

FIG. 17 is an exemplary flowchart of a data collection system according to illustrative implementation(s) of the innovations herein.

A application uses the Client SDK at 1702 to report telemetry data to the Data Collection System at 1704. The Data Collection system stores the telemetry data in Event logs at 1704. The system runs an ETL (Extract transform and load) process that adds the linking between transactions, entities and properties, and builds the Descriptive Data Format for this data that is stored in the Analytics DB at 1706. Then the Mart Process further transforms the data into a format that is appropriate for reporting and puts it into the Data Mart at 1708. Finally, the Advanced Analytics Tool displays the reports to the tool operator at 1710.

FIG. 18 is an exemplary flowchart of a tuning system according to illustrative implementation(s) of the innovations herein.

The application instructs the Client SDK at 1802 to request one or more tuning variables from the Tuning Variable System at 1804.

The Tuning Variable System checks to see if the requested tuning variable is part of an active test.

If the tuning variable is not part of an active test, the system will return the default value for the tuning variable to the Client SDK.

If the tuning variable is part of an active test, then the Tuning Variable System will check to see if the variable has been assigned to a test variant.

If the variable has been assigned to a test variant, then the value for that variant will be returned to the SDK.

If the variable has not been assigned to a variant then the Entity Segmentation Service (also referred to as User Segmentation Service) will see if the entity (user, device, etc) is part of a segment that is assigned to the test.

If the entity is not qualified as part of a segment, then the Tuning Variable System will return the default value for the Tuning Variable.

If the entity is part of segment that is assigned to the test, then it will be assigned to a variant.

The value for that variant will be returned to the Client SDK

Figure 19:
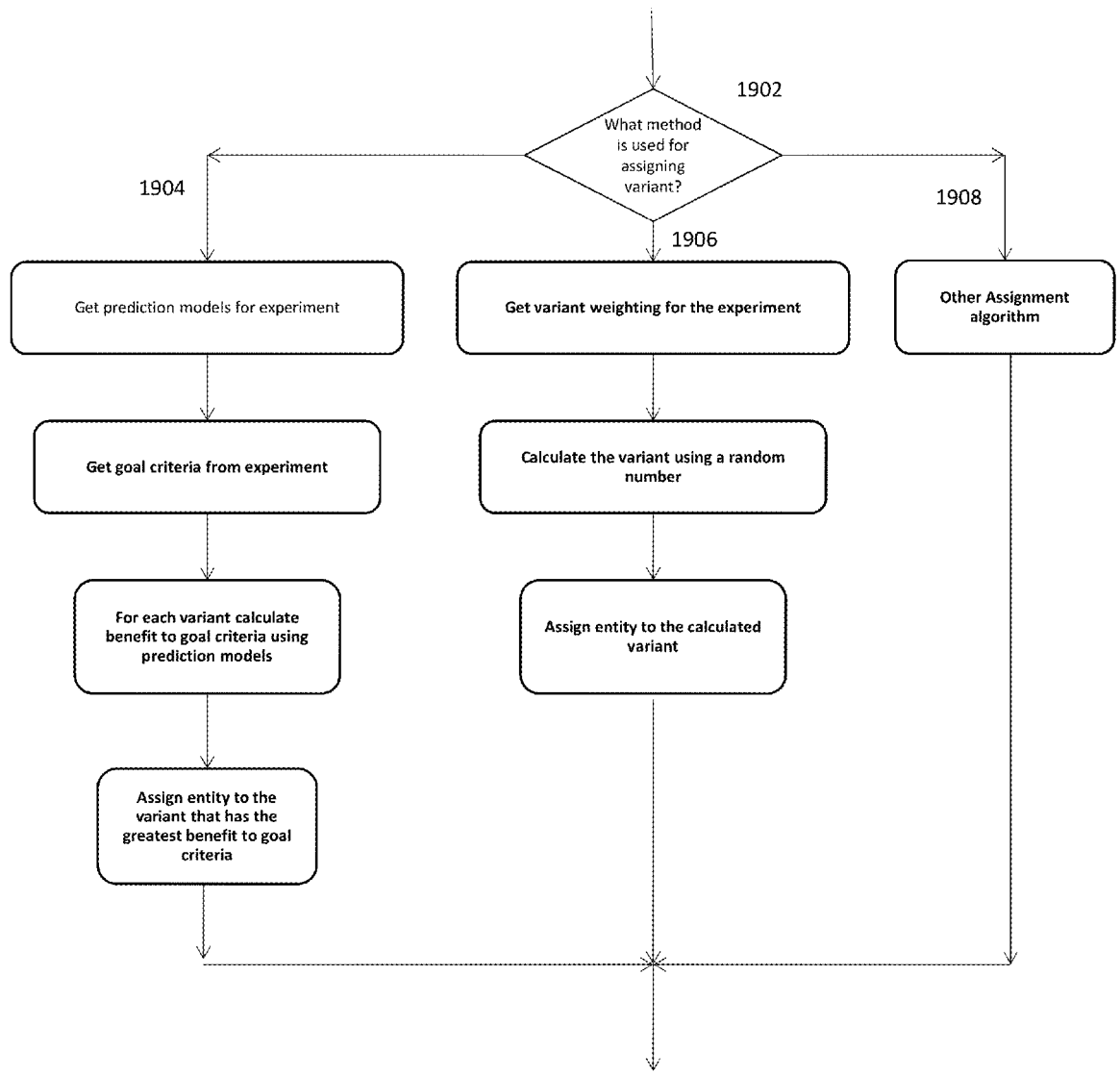
FIG. 19 is an exemplary flowchart of assigning an entity to a variant according to illustrative implementation(s) of the innovations herein.

FIG. 19 is an exemplary flowchart of assigning an entity to a variant according to illustrative implementation(s) of the innovations herein.

First the type of the test that was defined when the test was created would determine which method is used for assigning the variant at 1902. The flow for assigning a variable using a predictive model is shown at 1904. The flow for using a random weighting per variant to assign variables is shown at 1906. Finally, other algorithms may also be used as shown at 1908.

In connection with the details above, the systems and methods described herein may be implemented via one or more components, systems, servers, appliances, other components, or distributed between such elements. When implemented as a system, such system may comprise components such as a general-purpose CPU, RAM, etc. found in general-purpose computers, and/or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware, though no embodiments herein include/encompass transitory media. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques. Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. An application optimization system, comprising:
   a plurality of client devices transmitting user application interaction data to at least one server;
   at least one hardware server processing the user application interaction data into descriptive data including the user application interaction data and relations between the user application interaction data, wherein the relations are based on at least one of user properties, time, application interaction, transactions, transaction properties, interaction properties, and corresponding relationships between them, the at least one server comprising non-transitory computer-readable media embodying computer-readable instructions operable to cause one or more processors to perform a method for optimizing an application, the method including:
  receiving, via a server comprising a processor circuit, a request for a tuning variable configured to control behavior of an application;
  analyzing, via the server, the request, including determining whether the requested tuning variable is assigned to an active experiment;
  assigning, via the server, a value to the tuning variable based on the analyzing, the assigning comprising:
    when the requested tuning variable is assigned to an active experiment, determining whether an entity associated with the request is assigned to the active experiment and/or qualified for the active experiment;
    when the entity associated with the request is assigned to the active experiment and/or qualified for the active experiment, assigning a value associated with the active experiment to the tuning variable; and
    when the entity associated with the request is not assigned to the active experiment and/or qualified for the active experiment, assigning a default value to the tuning variable; and
  sending, via the server, the tuning variable.

2. The system of claim 1, wherein the user properties include gender, user credential type, nickname, or user identifier.

3. The system of claim 1, wherein the relations include transactions starting and ending a session with an application, viewing a screen in the application, making a purchase in the application, and/or signing into the application.

4. The system of claim 1, wherein the transactions include a session identifier for a session transaction, login transaction.

5. The system of claim 1, further comprising:
  one of the client devices requests tuning data from the at least one server;
  the at least one server transmits the tuning data based on the requesting client device, tests running on the client device, and user segment.

6. The system of claim 1, further comprising tests run on the plurality of client devices based on the descriptive data.

7. The system of claim 6, wherein the tuning data is a value of an item purchasable in an application.

8. The system of claim 6, wherein the tests are one of NB tests, multivariate tests, multi-armed bandit test.

9. The system of claim 1, further comprising one or more of:
  defining a plurality of user segments based on the descriptive data and a performance indicator;
  applying tests to the defined plurality of user segments;
  monitoring the performance indicator of the plurality of user segments; and
  determining the user segment maximizing the performance indicator.

10. The system of claim 1, the instructions further comprising:
  classifying a plurality of application usage patterns common to a set of users from among a plurality of users;
  storing predictive data including the classified application usage patterns.

11. The system of claim 10, the instructions further comprising:
  converting the predictive data into runtime predictive data;
  generating user segments of the application based on the runtime predictive data without interrupting the application.

12. An application optimization system, comprising:
  a client device requesting a tuning variable modifying an application from a tuning server;
  a hardware tuning server, the tuning server determining a variant for the client device;
  the tuning server transmitting the tuning variable to the application based on a client device experiment and the determined variant; and
  the tuning server comprising non-transitory computer-readable media embodying computer-readable instructions operable to cause one or more processors to perform a method for optimizing an application, the method including:
    receiving, via a server comprising a processor circuit, a request for a tuning variable configured to control behavior of an application;
    analyzing, via the server, the request, including determining whether the requested tuning variable is assigned to an active experiment;
    assigning, via the server, a value to the tuning variable based on the analyzing, the assigning comprising:
      when the requested tuning variable is assigned to an active experiment, determining whether an entity associated with the request is assigned to the active experiment and/or qualified for the active experiment;
      when the entity associated with the request is assigned to the active experiment and/or qualified for the active experiment, assigning a value associated with the active experiment to the tuning variable; and
      when the entity associated with the request is not assigned to the active experiment and/or qualified for the active experiment, assigning a default value to the tuning variable; and
    sending, via the server, the tuning variable.

13. The system of claim 12, wherein the variant is determined by one of a prediction model and weighted percentage.

14. The system of claim 13, wherein the weighted percentage determines a variant weighting, calculates the variant from a random number generator and assigns an entity to the calculated variant.

15. The system of claim 13, wherein the prediction model obtains goal criteria, calculates variant benefit for each goal criteria and determines the variant that maximizes the goal criteria for the client device.

16. The system of claim 12, the instructions further comprising:
  classifying a plurality of application usage patterns common to a set of users from among a plurality of users;
  storing predictive data including the classified application usage patterns.

17. The system of claim 16, the instructions further comprising:
  converting the predictive data into runtime predictive data;
  generating user segments of the application based on the runtime predictive data without interrupting the application.

18. A method for optimizing an application, the method comprising:
  processing, via a hardware server comprising a processor circuit, a request for a tuning variable configured to control behavior of an application;

analyzing, via the server, the request;
assigning, via the server, a value to the tuning variable based on the analyzing; and
sending, via the server, the tuning variable;
wherein the analyzing comprises:
   determining whether the requested tuning variable is assigned to an active experiment;
wherein the assigning comprises:
   when the requested tuning variable is assigned to an active experiment, determining whether an entity associated with the request is assigned to the active experiment and/or qualified for the active experiment;
   when the entity associated with the request is assigned to the active experiment and/or qualified for the active experiment, assigning a value associated with the active experiment to the tuning variable; and
   when the entity associated with the request is not assigned to the active experiment and/or qualified for the active experiment, assigning a default value to the tuning variable.

19. The method of claim 18, further comprising:
classifying a plurality of application usage patterns common to a set of users from among a plurality of users;
storing predictive data including the classified application usage patterns.

20. The method of claim 19, further comprising:
converting the predictive data into runtime predictive data;
generating user segments of the application based on the runtime predictive data without interrupting the application.

21. The method of claim 18, wherein the assigning comprises: when the requested tuning variable is not assigned to an active experiment, assigning a default value to the tuning variable.

22. The method of claim 18 further comprising processing user application interaction data into descriptive data including the user application interaction data and relations between the user application interaction data, wherein the relations are based on at least one of user properties, time, application interaction, transactions, transaction properties, interaction properties, and corresponding relationships between them.

23. The method of claim 22, wherein the user properties include gender, user credential type, nickname, or user identifier.

24. The method of claim 22, wherein the relations include transactions starting and ending a session with an application, viewing a screen in the application, making a purchase in the application, and/or signing into the application.

25. The method of claim 22, wherein the transactions include a session identifier for a session transaction, login transaction.

26. The method of claim 18, further comprising:
requesting, via a client device, tuning data from the server;
transmitting the tuning data based on the requesting client device, tests running on the client device, and user segment.

27. The method of claim 22, further comprising running tests on a plurality of client devices based on the descriptive data.

28. The method of claim 27, wherein the tuning data is a value of an item purchasable in an application.

29. The method of claim 27, wherein the tests are one of A/B tests, multivariate tests, multi-armed bandit test.

30. The method of claim 22, further comprising one or more of:
defining a plurality of user segments based on the descriptive data and a performance indicator;
applying tests to the defined plurality of user segments;
monitoring the performance indicator of the plurality of user segments; and
determining the user segment maximizing the performance indicator.

31. The method of claim 18 further comprising:
determining a variant for a client device;
transmitting the tuning variable to the application based on a client device experiment and the determined variant.

32. The method of claim 31, wherein the variant is determined by one of a prediction model and weighted percentage.

33. The method of claim 32, wherein the weighted percentage determines a variant weighting, calculates the variant from a random number generator and assigns an entity to the calculated variant.

34. The method of claim 32, wherein the prediction model obtains goal criteria, calculates variant benefit for each goal criteria and determines the variant that maximizes the goal criteria for the client device.

* * * * *